United States Patent
Li et al.

(10) Patent No.: US 12,192,773 B2
(45) Date of Patent: Jan. 7, 2025

(54) COMMUNICATION METHOD AND APPARATUS

(71) Applicant: HUAWEI TECHNOLOGIES CO., LTD., Guangdong (CN)

(72) Inventors: Xiangyu Li, Shanghai (CN); Xiao Xiao, Shenzhen (CN); Bo Zhang, Shenzhen (CN); Jun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 238 days.

(21) Appl. No.: 17/852,739

(22) Filed: Jun. 29, 2022

(65) Prior Publication Data

US 2022/0330030 A1    Oct. 13, 2022

Related U.S. Application Data

(63) Continuation of application No. PCT/CN2019/130950, filed on Dec. 31, 2019.

(51) Int. Cl.
*H04L 29/06* (2006.01)
*H04W 12/106* (2021.01)
(Continued)

(52) U.S. Cl.
CPC ......... *H04W 12/50* (2021.01); *H04W 12/106* (2021.01); *H04W 76/14* (2018.02); *H04W 92/18* (2013.01)

(58) Field of Classification Search
CPC ... H04W 12/50; H04W 12/106; H04W 76/14; H04W 92/18; H04W 4/40; H04W 12/03
See application file for complete search history.

(56) References Cited

U.S. PATENT DOCUMENTS

2019/0045574 A1* 2/2019 Feng ............... H04W 76/12
2020/0029379 A1   1/2020 Xiao et al.
(Continued)

FOREIGN PATENT DOCUMENTS

CN    107079338 A    8/2017
CN    108781383 A    11/2018
(Continued)

OTHER PUBLICATIONS

Huawei et al: "Further discussion on LCID configuration for sidelink PDCP duplication", 3GPP Draft; R2-1804636 Further Discussion on LCID Configuration for Sidelink PDCP Duplication, 3rd Generation Partnership Project (3GPP), Mobile Competence Centre; 650, Route Des Lucioles; F-06921 S, vol. RAN WG2 (Year: 2018).*

(Continued)

*Primary Examiner* — Ka Shan Choy

(57) ABSTRACT

A communication method and apparatus are disclosed. According to the communication method, corresponding PDCP entities of a first terminal and a second terminal use consistent input parameters when executing security algorithms, thereby ensuring normal communication on a sidelink (SL) and improving communication reliability. In an example embodiment, a first terminal determines a logical channel identifier (LCID) meeting a preset condition, where a first packet data convergence protocol (PDCP) entity of the first terminal is associated with two or more logical channels (LCHs); the first terminal receives a first data packet from a second terminal; and the first PDCP entity of the first terminal parses the first data packet based on the LCID.

21 Claims, 13 Drawing Sheets

(51) Int. Cl.
*H04W 12/50* (2021.01)
*H04W 76/14* (2018.01)
*H04W 92/18* (2009.01)

(56) References Cited

U.S. PATENT DOCUMENTS

| | | | | |
|---|---|---|---|---|
| 2021/0021496 A1* | 1/2021 | Zhang | .................... | H04L 1/1812 |
| 2023/0073469 A1* | 3/2023 | Wang | .................... | H04W 40/22 |
| 2023/0354459 A1* | 11/2023 | Zhao | .................... | H04W 76/30 |
| 2023/0397278 A1* | 12/2023 | Wu | ................ | H04W 76/14 |

FOREIGN PATENT DOCUMENTS

| | | | |
|---|---|---|---|
| CN | 110572374 A | 12/2019 | |
| WO | 2016021981 A1 | 2/2016 | |
| WO | WO-2018171512 A1 * | 9/2018 | ............... H04L 1/08 |

OTHER PUBLICATIONS

Huawei et al: "On potential RAN2 impacts related to security design for NR SL", 3GPP Draft; R2-1915975, 3rd Generation Partnership Project (3GPP), Mobile Competence Centre; 650, Route Des Lucioles ; F-06921 Sophia-Antipolis Cedex; France, vol. RAN WG2, No. Reno, USA; Nov. 18, 2019-Nov. 22, 2019 (Year: 2019).*
Huawei et al., "On potential RAN2 impacts related to security design for NR SL", 3GPP TSG-RAN WG2 Meeting #108 R2-1915975, Nov. 22, 2019, total 4 pages.
International Search Report and Written Opinion issued in PCT/CN2019/130950, dated Sep. 27, 2020, 9 pages.
Huawei et al: "Further discussion on LCID configuration for sidelink PDCP duplication", 3GPP Draft; R2-1804636, Apr. 6. 2018, XP051415619, total 6 pages.
ZTE: "Consideration on LCID issue for data duplication", 3GPP Draft; R2-1801959, Feb. 14, 2018, XP051399051 ,total 4 pages.
ZTE: "Consideration on Data Duplication Design for PCS CA", 3GPP Draft; R2-1713071, Nov. 17, 2017, XP051371899, total 6 pages.
Extended European Search Report issued in EP19958078.8, dated Nov. 24, 2022, 12 pages.

* cited by examiner

COMMUNICATION METHOD AND APPARATUS

CROSS-REFERENCE TO RELATED APPLICATIONS

This application is a continuation of International Application No. PCT/CN2019/130950, filed on Dec. 31, 2019. The disclosures of the aforementioned application is hereby incorporated by reference in its entirety.

TECHNICAL FIELD

Embodiments of this application relate to the field of communication technologies, and in particular, to a communication method and a communication apparatus.

BACKGROUND

Vehicle to everything (V2X) refers to interconnecting a vehicle to the outside world, for example, interconnection and communication between vehicles, a vehicle and a person, a vehicle and a roadside infrastructure, and a vehicle and a network, by using an apparatus configured on the vehicle and various communication technologies. A link for direct communication between pieces of V2X user equipment (UEs) is a sidelink (SL), and a direct communication interface between the V2X UEs is a V2X PC5 interface.

In long term evolution (LTE) V2X, before device-to-device (D2D) unicast communication, PC5 signaling (PC5-S) connection establishment and security establishment need to be performed. After the PC5-S connection establishment and the security establishment are completed, subsequent corresponding user plane data transmission at an access stratum (AS) may be based on a security algorithm obtained through negotiation between UE 1 and UE 2 during the PC5-S connection establishment, and a logical channel identifier (LCID) is used as a bearer parameter in input parameters of a security algorithm at an AS stratum. To improve reliability of service transmission, packet data convergence protocol (PDCP) duplication may be introduced, that is, one PDCP entity is associated with a plurality of logical channels (LCHs). In this case, when executing security algorithms, a PDCP entity corresponding to sender UE and a PDCP entity corresponding to receiver UE may use different LCIDs as input parameters of the security algorithms. Consequently, the receiver UE cannot correctly parse a data packet sent by the sender UE. As a result, normal communication cannot be performed on an SL between the sender UE and the receiver UE.

SUMMARY

Embodiments of this application provide a communication method and apparatus, so that corresponding PDCP entities of a first terminal and a second terminal use consistent input parameters when executing security algorithms, thereby ensuring normal communication on a sidelink and improving communication reliability.

To achieve the foregoing objectives, embodiments of this application use the following technical solutions.

According to a first aspect of embodiments of this application, a communication method is provided. The method includes: A first terminal determines a logical channel identifier (LCID) meeting a preset condition, where a first packet data convergence protocol (PDCP) entity of the first terminal is associated with two or more logical channels (LCHs); the first terminal receives a first data packet from a second terminal; and the first PDCP entity of the first terminal parses the first data packet based on the LCID. Based on this solution, the first terminal determines the LCID meeting the preset condition, and after receiving the first data packet, parses, based on the LCID meeting the preset condition, the data packet sent by the second terminal. Therefore, after receiving the data packet, the first terminal parses, based on the LCID meeting the preset condition instead of based on any random LCID, the data packet sent by the second terminal. It may be understood that the LCID that meets the preset condition and that is determined by the first terminal is the same as an LCID used when the second terminal performs security protection on the first data packet. Therefore, it can be ensured that the first terminal can normally parse the first data packet based on the LCID meeting the preset condition, so that normal communication can be performed on an SL between the first terminal and the second terminal. That is, this solution can ensure consistency in input parameters used when corresponding PDCP entities of the first terminal and the second terminal execute security algorithms, so that normal communication can be performed on an SL between sender UE and receiver UE.

Optionally, the first terminal may determine, based on LCIDs corresponding to the two or more LCHs associated with the first PDCP entity of the first terminal, the LCID meeting the preset condition.

With reference to the first aspect, in a possible implementation, the first data packet is a data packet obtained by a second PDCP entity of the second terminal by performing security protection based on the LCID meeting the preset condition, and the second PDCP entity of the second terminal corresponds to the first PDCP entity of the first terminal. This solution can ensure that the LCID used when the second terminal performs security protection on the first data packet is consistent with the LCID used when the first terminal parses the first data packet, so that normal communication can be performed on the sidelink between the first terminal and the second terminal.

With reference to the first aspect and the foregoing possible implementation, in another possible implementation, the preset condition includes a first preset condition, and a size of the LCID meets the first preset condition. Based on this solution, the LCID that meets the preset condition and that is determined by the first terminal may be an LCID whose LCID size meets the first preset condition. For example, the LCID that meets the preset condition and that is determined by the first terminal may be a largest LCID, a smallest LCID, a second largest LCID, a second smallest LCID, or the like in the LCIDs corresponding to the two or more LCHs associated with the first PDCP entity of the first terminal. Specific content of the first preset condition is not limited in embodiments of this application.

With reference to the first aspect and the foregoing possible implementation, in another possible implementation, that a first terminal determines a logical channel identifier (LCID) meeting a preset condition includes: The first terminal determines, according to a preset rule, an LCID meeting the first preset condition, where the preset rule is predefined. Based on this solution, the first terminal may determine, based on the predefined rule, the LCID whose LCID size meets the first preset condition. For example, the preset rule may be specified in a protocol. To be specific, the first terminal may determine, according to the rule specified in the protocol, the LCID meeting the first preset condition. For example, as specified in a protocol, a largest LCID in LCIDs corresponding to LCHs associated with a PDCP entity is used as an input parameter of a security algorithm of the PDCP entity. In this case, the first terminal may determine, according to the rule, the largest LCID in the LCIDs corresponding to the two or more LCHs associated with the first PDCP entity of the first terminal as the LCID meeting the first preset condition.

With reference to the first aspect and the foregoing possible implementation, in another possible implementation, the method further includes: The first terminal receives first indication information from the second terminal, where the first indication information is used to indicate the first terminal to use an LCID meeting the first preset condition as an input parameter of a security algorithm of the first PDCP entity. Based on this solution, the first terminal may further receive the indication information sent by the second terminal, so that the first terminal can determine, based on the indication information of the second terminal, the LCID meeting the first preset condition. It should be noted that a granularity indicated by the first indication information may be all PDCP entities of the first terminal, or may be a PDCP entity of the first terminal.

With reference to the first aspect and the foregoing possible implementation, in another possible implementation, that a first terminal determines a logical channel identifier (LCID) meeting a preset condition includes: The first terminal determines, based on the first indication information, the LCID meeting the first preset condition. Based on this solution, the first terminal may determine, based on the indication information of the second terminal, the LCID meeting the first preset condition, so that the LCID that meets the first preset condition and that is determined by the first terminal is the same as the LCID used when the second terminal performs security protection on the first data packet. Therefore, it can be ensured that the first terminal can normally parse the first data packet based on the LCID meeting the preset condition, so that normal communication can be performed on the SL between the first terminal and the second terminal. Optionally, the first indication information may further include an LCID that meets the first preset condition and that is determined by the second terminal, and the first indication information is specifically used to indicate the first terminal to use the LCID that meets the first preset condition and that is determined by the second terminal as the input parameter of the security algorithm of the first PDCP entity.

With reference to the first aspect and the foregoing possible implementation, in another possible implementation, the first indication information is carried in first sidelink radio bearer (SLRB) configuration information, and the first SLRB configuration information is carried in a PC5-radio resource control (RRC) message. Based on this solution, when the first indication information is carried in the first SLRB configuration information, the first indication information indicates a PDCP entity corresponding to the first SLRB configuration to use the LCID meeting the first preset condition as an input parameter of a security algorithm of the PDCP entity. In this case, the granularity indicated by the first indication information is a PDCP entity. Optionally, the first indication information and the first SLRB configuration information may alternatively be separately sent.

With reference to the first aspect and the foregoing possible implementations, in another possible implementation, the LCID meeting the first preset condition is a smallest LCID or a largest LCID in the LCIDs corresponding to the two or more LCHs. Based on this solution, the first terminal may determine the smallest LCID or the largest LCID in the LCIDs corresponding to the two or more LCHs associated with the first PDCP entity as the LCID meeting the first preset condition. Optionally, the first terminal may determine a second smallest LCID, a second largest LCID, or the like in the LCIDs corresponding to the two or more LCHs associated with the first PDCP entity as the LCID meeting the first preset condition. This is not limited in this application.

With reference to the first aspect and the foregoing possible implementation, in another possible implementation, the preset condition includes a second preset condition, and an LCH configuration parameter corresponding to the LCID meets the second preset condition. Based on this solution, the LCID that meets the preset condition and that is determined by the first terminal may be an LCID corresponding to an LCH configuration parameter meeting the second preset condition. For example, the LCID that meets the preset condition and that is determined by the first terminal may be an LCID corresponding to a highest-priority LCH in the two or more LCHs associated with the first PDCP entity of the first terminal, or may be another LCID corresponding to an LCH whose LCH configuration parameter meets the second preset condition. Specific content of the second preset condition is not limited in embodiments of this application.

With reference to the first aspect and the foregoing possible implementation, in another possible implementation, the method further includes: The first terminal receives second indication information from the second terminal, where the second indication information includes a target LCID, the second indication information is used to indicate the first terminal to use the target LCID as an input parameter of a security algorithm of the first PDCP entity, and the target LCID is an LCID that corresponds to an LCH, that meets the second preset condition, and that is determined by the second terminal. Based on this solution, the first terminal may receive the second indication information sent by the second terminal, so that the first terminal can determine, based on the second indication information, the LCID meeting the second preset condition.

With reference to the first aspect and the foregoing possible implementation, in another possible implementation, that a first terminal determines a logical channel identifier (LCID) meeting a preset condition includes: The first terminal determines, based on the second indication information, the LCID meeting the second preset condition. Based on this solution, the first terminal may use, based on the second indication information sent by the second terminal, the LCID that corresponds to the LCH, that meets the second preset condition, and that is determined by the second terminal as the input parameter of the security algorithm of the first PDCP entity of the first terminal. Therefore, it can be ensured that the input parameters used when the PDCP entities corresponding to the first terminal and the second terminal execute the security algorithm are consistent, so that normal communication can be performed on the SL between the first terminal and the second terminal.

With reference to the first aspect and the foregoing possible implementation, in another possible implementation, the second indication information is carried in second SLRB configuration information, and the second SLRB configuration information is carried in a PC5-RRC message. Based on this solution, when the second indication information is carried in the second SLRB configuration information, the second indication information indicates a PDCP entity corresponding to the SLRB configuration information to use the LCID meeting the second preset condition as an input parameter of a security algorithm of the PDCP entity. In this case, a granularity indicated by the second indication information is a PDCP entity. Optionally, the second indication information and the second SLRB configuration information may alternatively be separately sent.

According to a second aspect of embodiments of this application, a communication method is provided. The method includes: A second terminal determines a logical channel identifier (LCID) meeting a preset condition, where a second packet data convergence protocol (PDCP) entity of the second terminal is associated with two or more logical channels (LCHs); the second terminal uses the LCID as an input parameter of a security algorithm of the second PDCP entity to perform security protection on a first data packet; and the second terminal sends the first data packet on which security protection is performed to a first terminal, where the LCID is an input parameter used when a first PDCP entity of the first terminal parses the first data packet, and the first PDCP entity of the first terminal corresponds to the second PDCP entity of the second terminal. Based on this solution, the second terminal determines the LCID meeting the preset condition, and uses the LCID as the input parameter of the security algorithm of the second PDCP entity of the second terminal to perform security protection on the first data packet, and the LCID is an input parameter used when the first PDCP entity of the first terminal parses the first data packet. Therefore, this solution can ensure that input parameters used when PDCP entities corresponding to the first terminal and the second terminal execute the security algorithm are consistent, so that normal communication can be performed on an SL between the first terminal and the second terminal.

With reference to the second aspect, in a possible implementation, the preset condition includes a first preset condition, and a size of the LCID meets the first preset condition. Based on this solution, the LCID that meets the preset condition and that is determined by the second terminal may be an LCID whose LCID size meets the first preset condition.

With reference to the second aspect and the foregoing possible implementation, in another possible implementation, that a second terminal determines a logical channel identifier (LCID) meeting a preset condition includes: The second terminal determines, according to a preset rule, an LCID meeting the first preset condition, where the preset rule is predefined. Based on this solution, the first terminal may determine, based on the predefined rule, the LCID whose LCID size meets the first preset condition. For example, the preset rule may be specified in a protocol.

With reference to the second aspect and the foregoing possible implementation, in another possible implementation, that a second terminal determines a logical channel identifier (LCID) meeting a preset condition includes: The second terminal determines, based on sizes of LCIDs corresponding to the two or more LCHs, an LCID meeting the first preset condition. Based on this solution, alternatively, the second terminal may independently determine, based on the sizes of the LCIDs corresponding to the two or more LCHs associated with the second PDCP entity, an LCID that is used as the input parameter of the security algorithm of the second PDCP entity.

With reference to the second aspect and the foregoing possible implementation, in another possible implementation, the method further includes: The second terminal receives third indication information from a network device, where the third indication information is used to indicate the second terminal to use an LCID meeting the first preset condition as the input parameter of the security algorithm of the second PDCP entity. Based on this solution, the second terminal may receive the third indication information of the network device, so that the second terminal determines, based on an indication of the network device, the LCID meeting the first preset condition. For example, the network device indicates the second terminal to use a greatest LCID or a smallest LCID as the input parameter of the security algorithm of the second PDCP entity.

With reference to the second aspect and the foregoing possible implementation, in another possible implementation, that a second terminal determines a logical channel identifier (LCID) meeting a preset condition includes: The second terminal determines, based on the third indication information, the LCID meeting the first preset condition. Based on this solution, the second terminal determines, based on the third indication information of the network device, the LCID meeting the first preset condition. For example, the second terminal may determine, based on the third indication information of the network device, that a greatest LCID or a smallest LCID is the LCID meeting the first preset condition.

With reference to the second aspect and the foregoing possible implementation, in another possible implementation, the third indication information further includes identification information of the first terminal. Based on this solution, the network device may indicate the second terminal to use an LCID meeting the first preset condition in unicast connection communication between the first terminal and the second terminal as the input parameter of the security algorithm of the second PDCP entity.

With reference to the second aspect and the foregoing possible implementations, in another possible implementation, the third indication information is carried in third sidelink radio bearer (SLRB) configuration information, and the third SLRB configuration information is carried in a radio resource control (RRC) message, a system information block (SIB), or a pre-configured message. Based on this solution, the third indication information sent by the network device may be carried in the RRC message, the SIB, or the pre-configured message. In this solution, the third indication information specifically indicates a PDCP entity corresponding to the SLRB configuration information to use the LCID meeting the first preset condition as an input parameter of a security algorithm of the PDCP entity. In this case, a granularity indicated by the third indication information is a PDCP entity. Optionally, the third indication information and the third SLRB configuration information may alternatively be separately sent.

With reference to the second aspect and the foregoing possible implementations, in another possible implementation, the method further includes: The second terminal sends first indication information to the first terminal, where the first indication information is used to indicate the first terminal to use the LCID meeting the first preset condition as an input parameter of a security algorithm of the first PDCP entity of the first terminal. Based on this solution, the second terminal may send the first indication information to the first terminal, to indicate the first terminal to use one of a plurality of LCIDs as the input parameter of the security algorithm of the first PDCP entity of the first terminal. Therefore, it can be ensured that input parameters used when PDCP entities corresponding to the first terminal and the second terminal execute the security algorithm are consistent.

With reference to the second aspect and the foregoing possible implementation, in another possible implementation, the first indication information is carried in first sidelink radio bearer SLRB configuration information, and the first SLRB configuration information is carried in a PC5-RRC message. Based on this solution, when the first indication information is carried in the first SLRB configuration information, the first indication information indicates a PDCP entity corresponding to the first SLRB configuration to use the LCID meeting the first preset condition as an input parameter of a security algorithm of the PDCP entity. In this case, the granularity indicated by the first indication information is a PDCP entity. Optionally, the first indication information and the first SLRB configuration information may alternatively be separately sent.

With reference to the second aspect and the foregoing possible implementations, in another possible implementation, the LCID meeting the first preset condition is a smallest LCID or a largest LCID in the LCIDs corresponding to the two or more LCHs. Based on this solution, the second terminal may determine the smallest LCID or the largest LCID in the LCIDs corresponding to the two or more LCHs associated with the second PDCP entity as the LCID meeting the first preset condition. Optionally, the second terminal may determine a second smallest LCID, a second largest LCID, or the like in the LCIDs corresponding to the two or more LCHs associated with the second PDCP entity as the LCID meeting the first preset condition. This is not limited in this application.

With reference to the second aspect and the foregoing possible implementation, in another possible implementation, the preset condition includes a second preset condition, and an LCH configuration parameter corresponding to the LCID meets the second preset condition. Based on this solution, the LCID that meets the preset condition and that is determined by the second terminal may be an LCID corresponding to an LCH configuration parameter meeting the second preset condition.

With reference to the second aspect and the foregoing possible implementation, in another possible implementation, that a second terminal determines a logical channel identifier (LCID) meeting a preset condition includes: The second terminal determines, based on LCH configuration parameters of the two or more LCHs, the LCID meeting the second preset condition. Based on this solution, the second terminal may independently determine, based on the LCH configuration parameters of the two or more LCHs associated with the second PDCP entity, an LCID that is used as the input parameter of the security algorithm of the second PDCP entity. For example, the second terminal may determine, based on the LCH configuration parameters of the two or more LCHs associated with the second PDCP entity, to use an LCID corresponding to a highest-priority LCH as the input parameter of the security algorithm of the second PDCP entity.

With reference to the second aspect and the foregoing possible implementation, in another possible implementation, the method further includes: The second terminal receives fourth indication information from a network device, where the fourth indication information includes a target LCH configuration parameter, the fourth indication information is used to indicate the second terminal to use the LCID meeting the second preset condition as the input parameter of the security algorithm of the second PDCP entity, and the LCID meeting the second preset condition is an LCID corresponding to the target LCH configuration parameter. Based on this solution, the second terminal may receive the fourth indication information of the network device, so that the second terminal determines, based on an indication of the network device, the LCID meeting the second preset condition. For example, the network device indicates the second terminal to use an LCID corresponding to a highest-priority LCH as the input parameter of the security algorithm of the second PDCP entity. Alternatively, the network device indicates the second terminal to use an LCID corresponding to an LCH associated with a configured grant type1 allowed CG as the input parameter of the security algorithm of the second PDCP entity.

With reference to the second aspect and the foregoing possible implementation, in another possible implementation, that a second terminal determines a logical channel identifier (LCID) meeting a preset condition includes: The second terminal determines, based on the fourth indication information, the LCID meeting the second preset condition. Based on this solution, the second terminal determines, based on the fourth indication information of the network device, the LCID meeting the second preset condition. For example, the second terminal may determine, based on the fourth indication information of the network device, that an LCID corresponding to a highest-priority LCH as the LCID meeting the second preset condition.

With reference to the second aspect and the foregoing possible implementations, in another possible implementation, the fourth indication information is carried in fourth SLRB configuration information, and the fourth SLRB configuration information is carried in an RRC message, a system information block SIB, or a pre-configured message. Based on this solution, when the fourth indication information is carried in the fourth SLRB configuration information, the fourth indication information sent by the network device specifically indicates a PDCP entity corresponding to the fourth SLRB configuration information to use the LCID meeting the second preset condition as an input parameter of a security algorithm of the PDCP entity. In this case, a granularity indicated by the fourth indication information is a PDCP entity. Optionally, the fourth indication information and the fourth SLRB configuration information may alternatively be separately sent.

With reference to the second aspect and the foregoing possible implementations, in another possible implementation, the method further includes: The second terminal sends second indication information to the first terminal, where the second indication information includes a target LCID, the second indication information is used to indicate the first terminal to use the target LCID as an input parameter of a security algorithm of the first PDCP entity of the first terminal, and the target LCID is an LCID that corresponds to an LCH, that meets the second preset condition, and that is determined by the second terminal. Based on this solution, the second terminal may send the second indication information to the first terminal, to indicate the first terminal to use one of a plurality of LCID as the input parameter of the security algorithm of the first PDCP entity of the first terminal. Therefore, it can be ensured that input parameters used when PDCP entities corresponding to the first terminal and the second terminal execute the security algorithm are consistent.

With reference to the second aspect and the foregoing possible implementation, in another possible implementation, the second indication information is carried in second SLRB configuration information, and the second SLRB configuration information is carried in a PC5-RRC message. Based on this solution, when the second indication information is carried in the second SLRB configuration information, the second indication information indicates a PDCP entity corresponding to the SLRB configuration information to use the LCID meeting the second preset condition as an input parameter of a security algorithm of the PDCP entity. In this case, a granularity indicated by the second indication information is a PDCP entity. Optionally, the second indication information and the second SLRB configuration information may alternatively be separately sent.

According to a third aspect of embodiments of this application, a communication method is provided. The method includes: A network device determines a preset condition; and the network device sends indication information to a second terminal, where the indication information is used to indicate the second terminal to use a logical channel identifier (LCID) meeting the preset condition as an input parameter of a security algorithm of a second packet data convergence protocol (PDCP) entity of the second terminal, and the second PDCP entity of the second terminal is associated with two or more logical channels (LCHs). Based on this solution, the network device may determine content of the preset condition, and send the indication information to the second terminal, to indicate the second terminal to use the LCID meeting the preset condition as the input parameter of the security algorithm of the second PDCP entity of the second terminal. It may be understood that, in this solution, sender UE may determine, based on an indication of the network device, an LCID that is used as an input parameter of a security algorithm of a PDCP entity of the sender UE. For example, the network device may be an access network device, or may be a core network device.

With reference to the third aspect, in a possible implementation, the preset condition includes a first preset condition, and a size of the LCID meets the first preset condition; and the indication information includes third indication information, and the third indication information is used to indicate the second terminal to use an LCID meeting the first preset condition as the input parameter of the security algorithm of the second PDCP entity of the second terminal. Based on this solution, the network device may determine content of the first preset condition based on the size of the LCID.

With reference to the third aspect and the foregoing possible implementation, in another possible implementation, the preset condition includes a second preset condition, and an LCH configuration parameter corresponding to the LCID meets the second preset condition; and the indication information includes fourth indication information, and the fourth indication information is used to indicate the second terminal to use an LCID meeting the second preset condition as the input parameter of the security algorithm of the second PDCP entity of the second terminal. Based on this solution, the network device may determine content of the second preset condition based on the LCH configuration parameter.

With reference to the third aspect and the foregoing possible implementation, in another possible implementation, the fourth indication information further includes a target LCH configuration parameter, and the LCID meeting the second preset condition is an LCID corresponding to the target LCH configuration parameter. Based on this solution, the network device may further send the target LCH configuration parameter to the second terminal, so that the second terminal determines the LCID corresponding to the target LCH configuration parameter as the input parameter of the security algorithm of the second PDCP entity of the second terminal.

With reference to the third aspect and the foregoing possible implementations, in another possible implementation, the indication information is carried in sidelink radio bearer (SLRB) configuration information, and the SLRB configuration information is carried in a radio resource control (RRC) message, a system information block (SIB), or a pre-configured message. Based on this solution, the indication information sent by the network device is carried in the SLRB configuration information, and the indication information may be the third indication information or the fourth indication information. In this solution, the network device may indicate a PDCP entity corresponding to the SLRB configuration information to use the LCID meeting the preset condition as an input parameter of a security algorithm of the PDCP entity. In this case, a granularity indicated by the indication information is a PDCP entity. Optionally, the indication information and the SLRB configuration information may alternatively be separately sent.

According to a fourth aspect of embodiments of this application, a communication method is provided. The method includes: A second terminal uses a first sidelink radio bearer identifier (SLRB ID) as an input parameter of a security algorithm to perform security protection on a first data packet; and the second terminal sends the first data packet on which security protection is performed to a first terminal, where the first data packet carries the first SLRB ID. Based on this solution, the first terminal uses the first SLRB ID as the input parameter of the security algorithm to perform security protection on the first data packet, and sends, to the second terminal, the first data packet carrying the first SLRB ID, so that after receiving the first data packet, the second terminal can parse the first data packet based on the first SLRB ID carried in the first data packet. Therefore, the first terminal and the second terminal may use a same SLRB ID as an input parameter, to ensure that data transmission on an SL between the first terminal and the second terminal can be protected by using a security algorithm.

According to a fifth aspect of embodiments of this application, a communication method is provided. The method includes: A first terminal receives a first data packet from a second terminal, where the first data packet carries a first sidelink radio bearer identifier (SLRB ID); and the first terminal parses the first data packet based on the first SLRB ID. Based on this solution, the second terminal may parse, based on the first SLRB ID carried in the first data packet, the first data packet sent by the first terminal, so that the second terminal can normally parse the first data packet, to ensure that data transmission on an SL between the first terminal and the second terminal can be protected by using a security algorithm. It may be understood that the first data packet that is from the second terminal and that is received by the first terminal is a data packet obtained by the second terminal by performing security protection based on the first SLRB ID.

With reference to the fourth aspect or the fifth aspect, in a possible implementation, the first SLRB ID is carried in a header of the first data packet. Based on this solution, the first SLRB ID is carried in the header of the first data packet, so that after receiving the first data packet, the first terminal can parse the first data packet based on the first SLRB ID carried in the header of the first data packet. In this way, when receiving the first data packet, the first terminal can learn of the first SLRB ID used when security protection is performed on the first data packet. Therefore, the first terminal can normally parse the first data packet, to ensure that data transmission on an SL between the first terminal and the second terminal can be protected by using a security algorithm. For example, the first SLRB ID may be carried in a PDCP header of the first data packet.

According to a sixth aspect of embodiments of this application, a communication method is provided. The method includes: A second terminal sends a first message to a first terminal, where the first message carries a first sidelink radio bearer identifier (SLRB ID); the second terminal receives a second message from the first terminal, where the second message is a message obtained by the first terminal by performing security protection based on the first SLRB ID; and the second terminal parses the second message based on the first SLRB ID. Based on this solution, the second terminal sends the first SLRB ID to the first terminal in advance, so that the first terminal can perform security protection on the second message based on the first SLRB ID, to ensure that an input parameter used by the second terminal to perform security protection on the second message is consistent with an input parameter used by the first terminal to parse the second message. Therefore, transmission on an SL between the second terminal and the first terminal can be protected by using a security algorithm.

Optionally, after the second terminal sends, to the first terminal, the first message carrying the first SLRB ID, the second terminal may further perform security protection on the second message based on the first SLRB ID, and send the second message on which security protection is performed to the first terminal. Based on this solution, after receiving the second message on which security protection is performed, the first terminal may perform security parsing on the second message based on the first SLRB ID carried in the first message.

According to a seventh aspect of embodiments of this application, a communication method is provided. The method includes: A first terminal receives a first message from a second terminal, where the first message carries a first sidelink radio bearer identifier (SLRB ID); the first terminal performs security protection on a second message based on the first SLRB ID; and the first terminal sends the second message on which security protection is performed to the second terminal. Based on this solution, the first terminal receives the first SLRB ID from the second terminal, and performs security protection on the second message based on the first SLRB ID, to ensure that an input parameter used by the second terminal to perform security protection on the second message is consistent with an input parameter used by the first terminal to parse the second message. Therefore, transmission on an SL between the second terminal and the first terminal can be protected by using a security algorithm.

Optionally, after receiving the first message that is from the second terminal and that carries the first SLRB ID, the first terminal may further receive the second message on which security protection is performed from the second terminal, and the first terminal may perform, based on the first SLRB ID carried in the first message, security parsing on the second message on which security protection is performed. The second message on which security protection is performed is a message obtained by the second terminal by performing security protection on the second message based on the first SLRB ID.

With reference to the sixth aspect or the seventh aspect, in a possible implementation, the first message is a PC5-S message, and the second message is a PC5-S message or a PC5-RRC message. Based on this solution, the second message may be a PC5-S message or a PC5-RRC message following the first message. In this way, an SLRB ID of the SRB carrying the second message may be sent to the first terminal in advance, so that the first terminal can perform security protection or security parsing on the second message based on the SLRB ID.

According to an eighth aspect of embodiments of this application, a communication apparatus is provided. The apparatus includes: a processing unit, configured to determine a logical channel identifier (LCID) meeting a preset condition, where a first packet data convergence protocol (PDCP) entity of the apparatus is associated with two or more logical channels (LCHs); and a transceiver unit, configured to receive a first data packet from a second terminal, where the processing unit is further configured to parse the first data packet based on the LCID.

Optionally, the processing unit is specifically configured to determine, based on LCIDs corresponding to the two or more LCHs associated with the first PDCP entity of the apparatus, the LCID meeting the preset condition.

With reference to the eighth aspect, in a possible implementation, the first data packet is a data packet obtained by a second PDCP entity of the second terminal by performing security protection based on the LCID meeting the preset condition, and the second PDCP entity of the second terminal corresponds to the first PDCP entity of the apparatus.

With reference to the eighth aspect, in a possible implementation, the preset condition includes a first preset condition, and a size of the LCID meets the first preset condition.

With reference to the eighth aspect and the foregoing possible implementation, in another possible implementation, the processing unit is specifically configured to determine, according to a preset rule, an LCID meeting the first preset condition, where the preset rule is predefined.

With reference to the eighth aspect and the foregoing possible implementation, in another possible implementation, the transceiver unit is further configured to receive first indication information from the second terminal, where the first indication information is used to indicate the apparatus to use an LCID meeting the first preset condition as an input parameter of a security algorithm of the first PDCP entity.

With reference to the eighth aspect and the foregoing possible implementation, in another possible implementation, the processing unit is specifically configured to determine, based on the first indication information, the LCID meeting the first preset condition.

With reference to the eighth aspect and the foregoing possible implementation, in another possible implementation, the first indication information is carried in first sidelink radio bearer (SLRB) configuration information, and the first SLRB configuration information is carried in a PC5-radio resource control (RRC) message.

With reference to the eighth aspect and the foregoing possible implementations, in another possible implementation, the LCID meeting the first preset condition is a smallest LCID or a largest LCID in the LCIDs corresponding to the two or more LCHs.

With reference to the eighth aspect and the foregoing possible implementation, in another possible implementation, the preset condition includes a second preset condition, and an LCH configuration parameter corresponding to the LCID meets the second preset condition.

With reference to the eighth aspect and the foregoing possible implementation, in another possible implementation, the transceiver unit is further configured to receive second indication information from the second terminal, where the second indication information includes a target LCID, the second indication information is used to indicate the apparatus to use the target LCID as an input parameter of a security algorithm of the first PDCP entity, and the target LCID is an LCID that corresponds to an LCH, that meets the second preset condition, and that is determined by the second terminal.

With reference to the eighth aspect and the foregoing possible implementation, in another possible implementation, the processing unit is further specifically configured to determine, based on the second indication information, the LCID meeting the second preset condition.

With reference to the eighth aspect and the foregoing possible implementations, in another possible implementation, the second indication information is carried in second SLRB configuration information, and the second SLRB configuration information is carried in a PC5-RRC message.

According to a ninth aspect of embodiments of this application, a communication apparatus is provided. The apparatus includes: a processing unit, configured to determine a logical channel identifier (LCID) meeting a preset condition, where a second packet data convergence protocol (PDCP) entity of the apparatus is associated with two or more logical channels (LCHs), where the processing unit is further configured to use the LCID as an input parameter of a security algorithm of the second PDCP entity to perform security protection on a first data packet; and a transceiver unit, configured to send the first data packet on which security protection is performed to a first terminal, where the LCID is an input parameter used when a first PDCP entity of the first terminal parses the first data packet, and the first PDCP entity of the first terminal corresponds to the second PDCP entity of the apparatus.

With reference to the ninth aspect, in a possible implementation, the preset condition includes a first preset condition, and a size of the LCID meets the first preset condition.

With reference to the ninth aspect and the foregoing possible implementation, in another possible implementation, the processing unit is specifically configured to determine, according to a preset rule, an LCID meeting the first preset condition, where the preset rule is predefined.

With reference to the ninth aspect and the foregoing possible implementation, in another possible implementation, the processing unit is further specifically configured to determine, based on sizes of LCIDs corresponding to the two or more LCHs, an LCID meeting the first preset condition.

With reference to the ninth aspect and the foregoing possible implementation, in another possible implementation, the transceiver unit is further configured to receive third indication information from a network device, where the third indication information is used to indicate the apparatus to use an LCID meeting the first preset condition as the input parameter of the security algorithm of the second PDCP entity.

With reference to the ninth aspect and the foregoing possible implementation, in another possible implementation, the processing unit is further specifically configured to determine, based on the third indication information, the LCID meeting the first preset condition.

With reference to the ninth aspect and the foregoing possible implementation, in another possible implementation, the third indication information further includes identification information of the first terminal.

With reference to the ninth aspect and the foregoing possible implementation, in another possible implementation, the third indication information is carried in third sidelink radio bearer (SLRB) configuration information, and the third SLRB configuration information is carried in a radio resource control (RRC) message, a system information block (SIB), or a pre-configured message.

With reference to the ninth aspect and the foregoing possible implementations, in another possible implementation, the transceiver unit is further configured to send first indication information to the first terminal, where the first indication information is used to indicate the first terminal to use the LCID meeting the first preset condition as an input parameter of a security algorithm of the first PDCP entity of the first terminal.

With reference to the ninth aspect and the foregoing possible implementation, in another possible implementation, the first indication information is carried in first sidelink radio bearer SLRB configuration information, and the first SLRB configuration information is carried in a PC5-RRC message.

With reference to the ninth aspect and the foregoing possible implementations, in another possible implementation, the LCID meeting the first preset condition is a smallest LCID or a largest LCID in the LCIDs corresponding to the two or more LCHs.

With reference to the ninth aspect and the foregoing possible implementation, in another possible implementation, the preset condition includes a second preset condition, and an LCH configuration parameter corresponding to the LCID meets the second preset condition.

With reference to the ninth aspect and the foregoing possible implementation, in another possible implementation, the processing unit is further specifically configured to determine, based on LCH configuration parameters of the two or more LCHs, an LCID meeting the second preset condition.

With reference to the ninth aspect and the foregoing possible implementation, in another possible implementation, the transceiver unit is further configured to receive fourth indication information from a network device, where the fourth indication information includes a target LCH configuration parameter, the fourth indication information is used to indicate the apparatus to use an LCID meeting the second preset condition as the input parameter of the security algorithm of the second PDCP entity, and the LCID meeting the second preset condition is an LCID corresponding to the target LCH configuration parameter.

With reference to the ninth aspect and the foregoing possible implementation, in another possible implementation, the processing unit is further specifically configured to determine, based on the fourth indication information, the LCID meeting the second preset condition.

With reference to the ninth aspect and the foregoing possible implementations, in another possible implementation, the fourth indication information is carried in fourth SLRB configuration information, and the fourth SLRB configuration information is carried in an RRC message, a system information block SIB, or a pre-configured message.

With reference to the ninth aspect and the foregoing possible implementations, in another possible implementation, the transceiver unit is further configured to send second indication information to the first terminal, where the second indication information includes a target LCID, the second indication information is used to indicate the first terminal to use the target LCID as an input parameter of a security algorithm of the first PDCP entity of the first terminal, and the target LCID is an LCID that corresponds to an LCH, that meets the second preset condition, and that is determined by the apparatus.

With reference to the ninth aspect and the foregoing possible implementation, in another possible implementation, the second indication information is carried in second SLRB configuration information, and the second SLRB configuration information is carried in a PC5-RRC message.

According to a tenth aspect of embodiments of this application, a communication apparatus is provided. The apparatus includes a processing unit, configured to determine a preset condition; and a transceiver unit, configured to send indication information to a second terminal, where the indication information is used to indicate the second terminal to use a logical channel identifier (LCID) meeting the preset condition as an input parameter of a security algorithm of a second packet data convergence protocol (PDCP) entity of the second terminal, and the second PDCP entity of the second terminal is associated with two or more logical channels (LCHs).

With reference to the tenth aspect, in a possible implementation, the preset condition includes a first preset condition, and a size of the LCID meets the first preset condition; and the indication information includes third indication information, and the third indication information is used to indicate the second terminal to use an LCID meeting the first preset condition as the input parameter of the security algorithm of the second PDCP entity of the second terminal.

With reference to the tenth aspect and the foregoing possible implementation, in another possible implementation, the preset condition includes a second preset condition, and an LCH configuration parameter corresponding to the LCID meets the second preset condition; and the indication information includes fourth indication information, and the fourth indication information is used to indicate the second terminal to use an LCID meeting the second preset condition as the input parameter of the security algorithm of the second PDCP entity of the second terminal.

With reference to the tenth aspect and the foregoing possible implementation, in another possible implementation, the fourth indication information further includes a target LCH configuration parameter, and the LCID meeting the second preset condition is an LCID corresponding to the target LCH configuration parameter.

With reference to the tenth aspect and the foregoing possible implementation, in another possible implementation, the indication information is carried in sidelink radio bearer (SLRB) configuration information, and the SLRB configuration information is carried in a radio resource control (RRC) message, a system information block (SIB), or a pre-configured message.

According to an eleventh aspect of embodiments of this application, a communication apparatus is provided. The apparatus includes: a processing unit, configured to: use a first sidelink radio bearer identifier (SLRB ID) as an input parameter of a security algorithm to perform security protection on a first data packet; and a transceiver unit, configured to send the first data packet on which security protection is performed to a first terminal, where the first data packet carries the first SLRB ID.

According to a twelfth aspect of embodiments of this application, a communication apparatus is provided. The apparatus includes: a transceiver unit, configured to receive a first data packet from a second terminal, where the first data packet carries a first sidelink radio bearer identifier (SLRB ID); and a processing unit, configured to parse the first data packet based on the first SLRB ID.

With reference to the eleventh aspect or the twelfth aspect, in a possible implementation, the first SLRB ID is carried in a header of the first data packet.

According to a thirteenth aspect of embodiments of this application, a communication apparatus is provided. The apparatus includes: a transceiver unit, configured to send a first message to a first terminal, where the first message carries a first sidelink radio bearer identifier (SLRB ID), where the transceiver unit is further configured to receive a second message from the first terminal, where the second message is a message obtained by the first terminal by performing security protection based on the first SLRB ID; and a processing unit, configured to parse the second message based on the first SLRB ID.

According to a fourteenth aspect of embodiments of this application, a communication apparatus is provided. The apparatus includes: a transceiver unit, configured to receive a first message from a second terminal, where the first message carries a first sidelink radio bearer identifier (SLRB ID); and a processing unit, configured to perform security protection on a second message based on the first SLRB ID, where the transceiver unit is further configured to send the second message on which security protection is performed to the second terminal.

With reference to the thirteenth aspect or the fourteenth aspect, in a possible implementation, the first message is a PC5-S message, and the second message is a PC5-S message or a PC5-RRC message.

For effect descriptions of the eighth aspect and the implementations of the eighth aspect, refer to descriptions of corresponding effects of the first aspect and the implementations of the first aspect. For effect descriptions of the ninth aspect and the implementations of the ninth aspect, refer to descriptions of corresponding effects of the second aspect and the implementations of the second aspect. For effect descriptions of the tenth aspect and the implementations of the tenth aspect, refer to descriptions of corresponding effects of the third aspect and the implementations of the third aspect. For effect descriptions of the eleventh aspect and the implementations of the eleventh aspect, refer to descriptions of corresponding effects of the fourth aspect and the implementations of the fourth aspect. For effect descriptions of the twelfth aspect and the implementations of the twelfth aspect, refer to descriptions of corresponding effects of the fifth aspect and the implementations of the fifth aspect. For effect descriptions of the thirteenth aspect and the implementations of the thirteenth aspect, refer to descriptions of corresponding effects of the sixth aspect and the implementations of the sixth aspect. For effect descriptions of the fourteenth aspect and the implementations of the fourteenth aspect, refer to descriptions of corresponding effects of the seventh aspect and the implementations of the seventh aspect. Details are not described herein again.

According to a fifteenth aspect of embodiments of this application, a computer-readable storage medium is provided. The computer-readable storage medium stores computer program code. When the computer program code is run on a processor, the processor is enabled to perform the communication method according to any one of the foregoing aspects.

According to a sixteenth aspect of embodiments of this application, a computer program product is provided. The program product stores computer software instructions executed by a processor, and the computer software instructions include a program used to perform the communication method according to any one of the foregoing aspects.

According to a seventeenth aspect of embodiments of this application, a communication apparatus is provided. The apparatus includes a processor, and may further include a transceiver and a memory. The transceiver is configured to send and receive information, or is configured to communicate with another network device. The memory is configured to store computer-executable instructions. The processor is configured to execute the computer-executable instructions, to implement the communication method according to any one of the foregoing aspects.

According to an eighteenth aspect of embodiments of this application, a communication apparatus is provided. The apparatus may exist in a product form of a chip. A structure of the apparatus includes a processor, and may further include a memory. The memory is coupled to the processor, and is configured to store program instructions and data that are necessary for the apparatus. The processor is configured to execute the program instructions stored in the memory, to support a terminal device or a network device in performing the communication method according to any one of the foregoing aspects.

According to a nineteenth aspect of embodiments of this application, a communication apparatus is provided. The apparatus may exist in a product form of a chip. A structure of the apparatus includes a processor and an interface circuit. The processor is configured to communicate with another apparatus through a receiving circuit, to enable the apparatus to perform the communication method according to any one of the foregoing aspects.

According to a twentieth aspect of embodiments of this application, a communication system is provided. The system includes a first terminal and a second terminal. The first terminal is configured to perform the communication method according to the first aspect, and the second terminal is configured to perform the communication method according to the second aspect.

According to a twenty-first aspect of embodiments of this application, a communication system is provided. The system includes a first terminal, a second terminal, and a network device. The first terminal is configured to perform the communication method according to the first aspect, the second terminal is configured to perform the communication method according to the second aspect, and the network device is configured to perform the communication method according to the third aspect.

According to a twenty-second aspect of embodiments of this application, a communication system is provided. The system includes a first terminal and a second terminal. The second terminal is configured to perform the communication method according to the fourth aspect, and the first terminal is configured to perform the communication method according to the fifth aspect.

According to a twenty-third aspect of embodiments of this application, a communication system is provided. The system includes a first terminal and a second terminal. The second terminal is configured to perform the communication method according to the sixth aspect, and the first terminal is configured to perform the communication method according to the seventh aspect.

DESCRIPTION OF EMBODIMENTS

The following describes technical solutions in embodiments of this application with reference to the accompanying drawings in embodiments of this application. In this application, "at least one" means one or more, and "a plurality of" means two or more. A term "and/or" describes an association relationship between associated objects and indicates that three relationships may exist. For example, A and/or B may indicate any one of the following cases: Only A exists, both A and B exist, or only B exists, where A and B may be singular or plural. A character "/" generally indicates an "or" relationship between the associated objects. "At least one of the following items (pieces)" or a similar expression thereof refers to any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity and an execution sequence. For example, "first" in a first terminal and "second" in a second terminal in embodiments of this application are merely used to distinguish between different terminal devices.

It should be noted that in this application, the word such as "example" or "for example" is used to indicate giving an example, an illustration, or a description. Any embodiment or design solution described by using "example" or "for example" in this application shall not be construed as being more preferred or more advantageous than another embodiment or design solution. Exactly, use of the word "example", "for example", or the like is intended to present a related concept in a specific manner.

Figure 1:
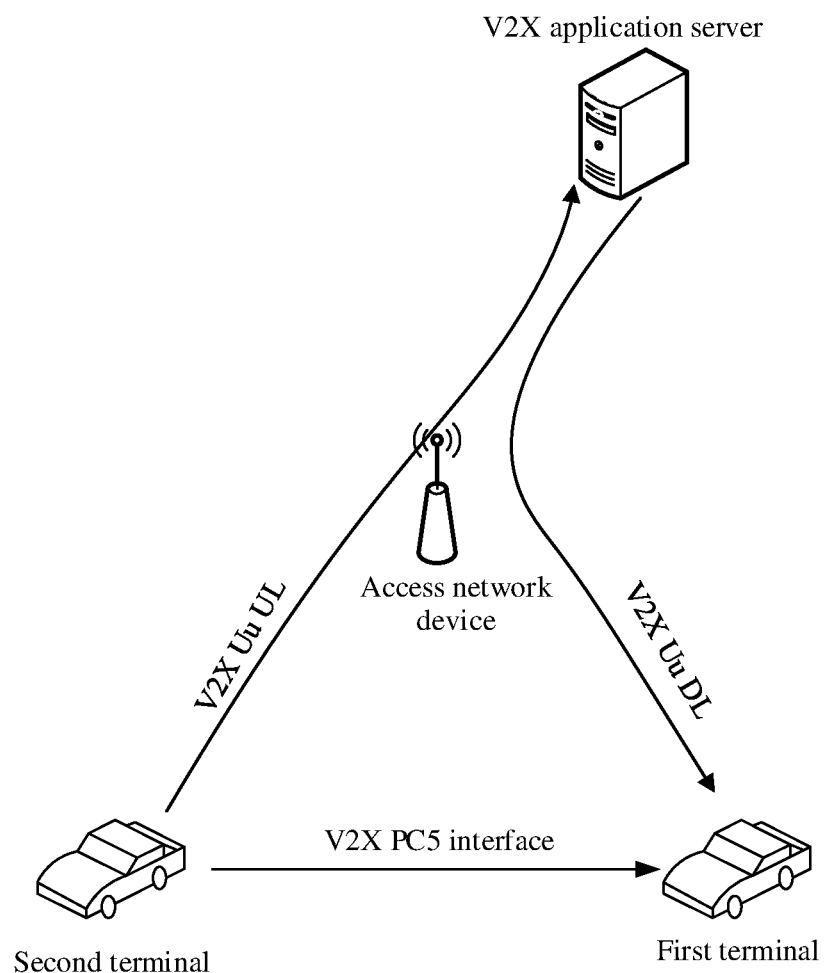
FIG. 1 is a schematic diagram of a V2X communication scenario according to an embodiment of this application.

Embodiments of this application provide a communication method. The communication method is applied to a V2X communication scenario shown in FIG. 1. As shown in FIG. 1, a first terminal and a second terminal communicate with each other on a sidelink (SL). The sidelink is a secondary link in a V2X network. The V2X network further includes an uplink (UL) and a downlink (DL) in addition to the secondary link. For example, V2X communication includes vehicle-to-vehicle (V2V) communication, vehicle-to-infrastructure (V2I) communication, vehicle-to-people (V2P) communication, and vehicle-to-network (V2N) communication. V2V communication between the first terminal and the second terminal that are both vehicles is merely used as an example in FIG. 1. A specific V2X communication scenario is not limited in embodiments of this application. For example, communication between the first terminal and the second terminal may be communication between vehicle-mounted devices, communication between a road side unit (RSU) and a vehicle-mounted device and/or a network device (for example, a base station device), or communication between a network device (for example, a base station device) and a vehicle-mounted device and/or an RSU. The network device may be an LTE base station device, an NR base station device, or a base station in a subsequent evolved system. It may be understood that specific forms of the first terminal and the second terminal are not limited in embodiments of this application, and the descriptions herein are merely examples. For example, an access network device in FIG. 1 may be a base station, or a device that is in a network and that provides radio access.

The V2X communication architecture shown in FIG. 1 includes two communication interfaces: a PC5 interface and a Uu interface. The V2X PC5 interface is a direct communication interface between V2X terminals. Communication through the V2X Uu interface is a communication mode in which a sender V2X terminal (for example, the second terminal) sends V2X data to an access network device (for example, a base station) through the Uu interface, the access network device sends the V2X data to a V2X application server for processing, then the V2X application server delivers the V2X data to an access network device, and the access network device sends the V2X data to a receiver V2X terminal (for example, the first terminal). In the mode of communication through the V2X Uu interface, the access network device that forwards uplink data from the terminal to the server and the access network device that forwards downlink data delivered by the server to the receiver terminal may be a same access network device, or may be different access network devices. This may be specifically determined by the V2X application server.

Figure 2:
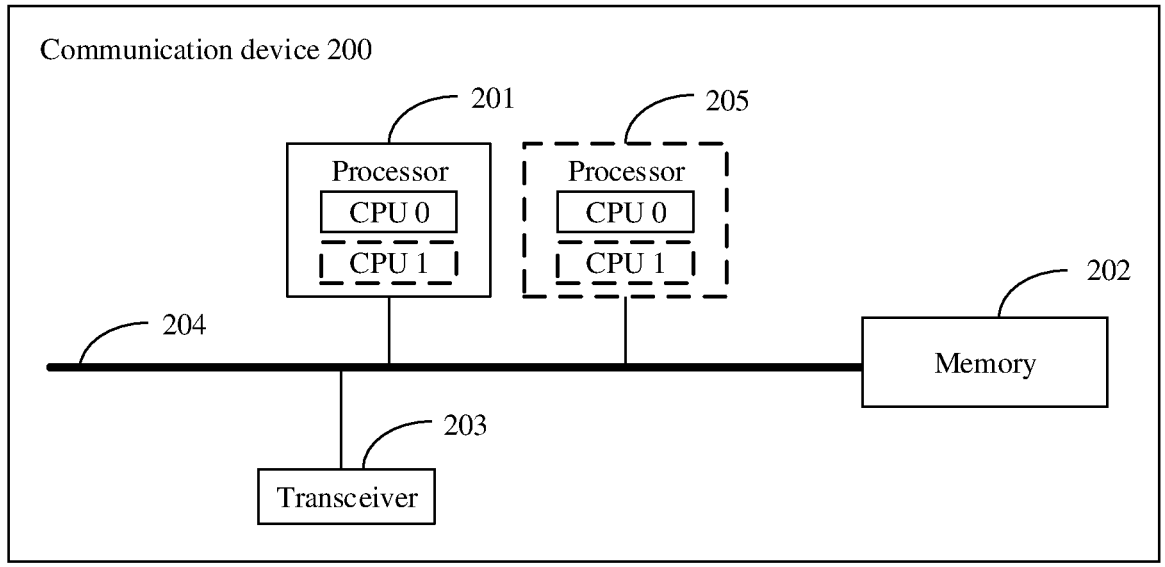
FIG. 2 is a schematic diagram of a structure of a communication device according to an embodiment of this application.

FIG. 2 shows a communication device according to an embodiment of this application. The communication device may be a first terminal or a second terminal in this application. The communication device may be a vehicle, may be a vehicle-mounted communication apparatus or a vehicle-mounted terminal that is mounted on the vehicle and that is configured to assist the vehicle in driving, or may be a chip that is in the vehicle-mounted communication apparatus or the vehicle-mounted terminal. The vehicle-mounted terminal may be a device configured to implement a wireless communication function, for example, a terminal or a chip that can be used in the terminal. The terminal may be user equipment (UE), an access terminal, a terminal unit, a terminal station, a mobile station, a remote station, a remote terminal, a mobile device, a wireless communication device, a terminal agent, a terminal apparatus, or the like in a 5G network or a future evolved public land mobile network (PLMN). The access terminal may be a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device or a wearable device, a virtual reality (VR) terminal device, an augmented reality (AR) terminal device, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. The vehicle-mounted terminal may be movable or fixed.

As shown in FIG. 2, the communication device 200 includes at least one processor 201, a memory 202, a transceiver 203, and a communication bus 204.

The following specifically describes each component of the communication device with reference to FIG. 2.

The processor 201 is a control center of the communication device, and may be one processor or may be a general name of a plurality of processing elements. For example, the processor 201 is a central processing unit (CPU), or an application-specific integrated circuit (ASIC), or is configured as one or more integrated circuits for implementing embodiments of the present invention, for example, one or more microprocessors (DSP) or one or more field programmable gate arrays (FPGA).

The processor 201 may perform various functions of the communication device by running or executing a software program stored in the memory 202 and invoking data stored in the memory 202.

During specific implementation, in an embodiment, the processor 201 may include one or more CPUs, for example, a CPU 0 and a CPU 1 shown in FIG. 2.

During specific implementation, in an embodiment, the communication device may include a plurality of processors, for example, the processor 201 and a processor 205 shown in FIG. 2. Each of the processors may be a single-core (single-CPU) processor or may be a multi-core (multi-CPU) processor. The processor herein may be one or more communication devices, circuits, and/or processing cores configured to process data (for example, computer program instructions).

The memory 202 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage medium, an optical disc storage medium (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. The memory 202 may exist independently, and is connected to the processor 201 by using the communications bus 204. Alternatively, the memory 202 may be integrated with the processor 201.

The memory 202 is configured to store a software program for executing the solutions of the present invention, and the processor 201 controls the execution.

The transceiver 203 is configured to communicate with another communication device. Certainly, the transceiver 203 may be further configured to communicate with a communication network, for example, the Ethernet, a radio access network (RAN), or a wireless local area network (WLAN). The transceiver 203 may include a receiving unit to implement a receiving function, and a sending unit to implement a sending function.

The communications bus 204 may be an industry standard architecture (ISA) bus, a peripheral component interconnect (peripheral component, PCI) bus, an extended industry standard architecture (EISA) bus, or the like. The bus may be classified into an address bus, a data bus, a control bus, and the like. For ease of denotation, the bus is denoted by using only one bold line in FIG. 2. However, this does not indicate that there is only one bus or only one type of bus.

The structure of the communication device shown in FIG. 2 does not constitute a limitation on the communication device. The communication device may include more or fewer components than those shown in the figure, or combine some components, or have different component arrangements.

In V2X, before D2D unicast communication is performed, PC5-S connection establishment and security establishment need to be performed. After the PC5-S connection establishment and the security establishment are completed, security protection may be performed on subsequent corresponding data transmission at an AS stratum and transmission of a PC5-S message based on a security algorithm obtained through negotiation by receiver UE and sender UE when the PC5-S connection establishment is performed.

Figure 3:
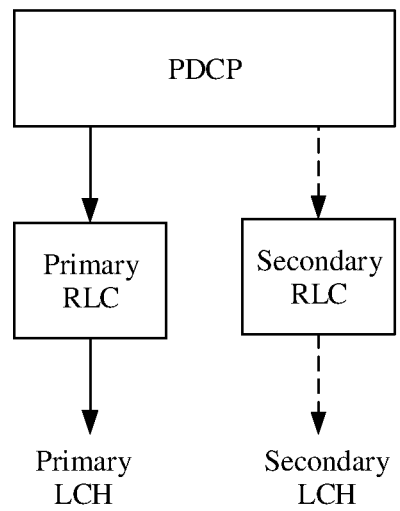
FIG. 3 is a schematic diagram of PDCP duplication according to an embodiment of this application.

When an input parameter of the security algorithm at the AS stratum is an LCID, PDCP duplication may be introduced to improve service transmission reliability. As shown in FIG. 3, after performing a security algorithm operation (for example, integrity protection and encryption) on a PDCP packet, a PDCP entity duplicates the PDCP packet and transmits the PDCP packet to a plurality of radio link control (RLC) entities, for example, a primary RLC entity and a secondary RLC entity in FIG. 3. The two RLC entities independently process the packet, and transmit processed packet to a medium access control (MAC) layer on the two LCHs. For the MAC layer, the packets transmitted by the two RLC entities are two independent packets, and the MAC layer cannot identify whether the packets are data packets transmitted through PDCP duplication. The MAC layer only needs to perform scheduling based on an algorithm. It should be noted that one PDCP entity may be associated with more RLC entities/LCHs. In FIG. 3, only an example in which one PDCP entity is associated with two RLC entities/LCHs is used for description.

When a security algorithm is executed, an LCID needs to be used as an input parameter of the security algorithm. When PDCP duplication is introduced, one PDCP entity may be associated with a plurality of LCHs, and the plurality of LCHs correspond to different LCIDs. Therefore, when executing security algorithms, a PDCP entity corresponding to sender UE and a PDCP entity corresponding to receiver UE may use different LCIDs as input parameters of the security algorithms. Consequently, the receiver UE cannot correctly parse a data packet sent by the sender UE, and the receiver UE fails to receive data. As a result, normal communication cannot be performed on an SL between the sender UE and the receiver UE.

To resolve a problem that SL communication fails because it cannot be ensured that when the PDCP entities of the sender UE and the receiver UE are associated with a plurality of LCHs, input parameters used when the corresponding PDCP entities of the sender UE and the receiver UE execute security algorithms are consistent, embodiments of this application provide a communication method to ensure consistency in input parameters used when corresponding PDCP entities of sender UE and receiver UE execute security algorithms, thereby ensuring normal SL communication and improving communication reliability.

With reference to FIG. 1 to FIG. 3, FIG. 4 shows a communication method according to an embodiment of this application. The communication method includes steps S401 to S406.

S401. A second terminal determines a first LCID meeting a preset condition.

A second PDCP entity of the second terminal is associated with two or more LCHs, and one LCH may correspond to one LCID. An LCID corresponding to each LCH may be allocated by the second terminal, or may be obtained through negotiation between the second terminal and a first terminal.

For example, the second terminal may include one or more second PDCP entities, one second PDCP entity may be associated with two or more LCHs, and quantities of LCHs associated with different second PDCP entities may be the same or may be different. A quantity of second PDCP entities included in the second terminal and a specific quantity of LCHs associated with each second PDCP entity are not limited in this embodiment of this application. When the second terminal includes a plurality of second PDCP entities, each second PDCP entity may correspond to one first LCID, where the first LCID may be an LCID meeting the preset condition in LCIDs corresponding to a plurality of LCHs associated with the second PDCP, and the first LCID is an input parameter used by the second PDCP entity to execute a security algorithm. It should be noted that, that the first LCID is an input parameter used by the second PDCP entity to execute a security algorithm in this embodiment means that the first LCID is an input parameter used when the second PDCP entity executes the security algorithm, and another input parameter may be further included when the second PDCP entity executes the security algorithm.

It should be noted that, in unicast connection communication, an LCID is unique. In other words, in unicast connection communication in which an ID of a sender and an ID of a receiver are the same, and an LCID corresponding to an LCH associated with a PDCP entity of the sender/receiver is unique. For example, the ID of the sender and the ID of the receiver are both a layer 2 identifier L2 ID. For example, the second terminal is UE 1, the first terminal is UE 2, the UE 1 includes two second PDCP entities, one second PDCP entity is associated with two LCHs, the other second PDCP entity is associated with three LCHs, the UE 2 includes two first PDCP entities, one first PDCP entity is associated with two LCHs, and the other first PDCP entity is associated with three LCHs. In unicast connection communication between the UE 1 and the UE 2, LCIDs corresponding to the five LCHs associated with the two second PDCP entities of the UE 1 are different from each other, an LCID corresponding to each LCH is unique in unicast connection communication between the UE 1 and the UE 2. It may be understood that the two second PDCP entities of the UE 1 separately correspond to the two first PDCP entities of the UE 2, and an LCID corresponding to an LCH associated with a second PDCP entity of the UE 1 is the same as an LCID corresponding to an LCH associated with a first PDCP entity that is of the UE 2 and that corresponds to the second PDCP entity.

For example, the preset condition may include a first preset condition. A size of the first LCID meets the first preset condition. The first LCID may be an LCID that is in LCIDs corresponding to the two or more LCHs associated with the second PDCP entity of the second terminal and whose LCID size meets the first preset condition.

For example, the first preset condition may be that an LCID is the largest, an LCID is the smallest, an LCID is the second largest, an LCID is the second smallest, or the like. For example, when the first preset condition is that an LCID is the largest, the first LCID is a largest LCID in the LCIDs corresponding to the two or more LCHs associated with the second PDCP entity of the second terminal. When the first preset condition is that an LCID is the smallest, the first LCID is a smallest LCID in the LCIDs corresponding to the two or more LCHs associated with the second PDCP entity of the second terminal. When the first preset condition is that an LCID is the second smallest, the first LCID is a second smallest LCID in the LCIDs corresponding to the two or more LCHs associated with the second PDCP entity of the second terminal. When the first preset condition is that an LCID is the second largest, the first LCID is a second largest LCID in the LCIDs corresponding to the two or more LCHs associated with the second PDCP entity of the second terminal. The first preset condition that the size of the first LCID specifically meets is not limited in this embodiment. The following embodiment is described only by using an example in which the size of the first LCID is the largest or the smallest.

In a first implementation, step S401 may include: The second terminal determines, according to a preset rule, a first LCID meeting the first preset condition. The preset rule is a predefined rule. For example, the preset rule may be a rule specified in a protocol, and the second terminal may determine, according to the rule specified in the protocol, the first LCID meeting the first preset condition.

For example, as specified in the protocol, a largest LCID or a smallest LCID in LCIDs corresponding to two or more LCHs associated with a PDCP entity may be used as an input parameter of a security algorithm of the PDCP entity. In this implementation, if the second terminal includes a plurality of second PDCP entities, each second PDCP entity determines, as a first LCID, a largest LCID or a smallest LCID in LCIDs corresponding to LCHs associated with the second PDCP entity, where the first LCID is an input parameter of a security algorithm of the second PDCP entity. To be specific, each second PDCP entity included in the second terminal determines, according to the preset rule, an LCID that is in LCIDs corresponding to LCHs associated with the second PDCP entities and whose size meets the first preset condition.

It may be understood that, in this implementation, the second terminal and the first terminal each may determine, according to the preset rule specified in the protocol, to use one of a plurality of LCIDs as an input parameter of a security algorithm, and LCIDs of the second terminal and the first terminal are in a one-to-one correspondence. Therefore, when corresponding PDCP entities execute the security algorithms according to the rule, input parameters of the security algorithms are the same for the second terminal and the first terminal. In this implementation, consistency in input parameters used when the corresponding PDCP entities of the second terminal and the first terminal execute the security algorithms can be ensured without a need of exchanging the rule between the second terminal and the first terminal.

In a second implementation, step S401 may include: The second terminal determines, based on sizes of LCIDs corresponding to the two or more LCHs, a first LCID meeting the first preset condition. For example, in this implementation, the second terminal may independently determine, based on the sizes of the LCIDs, to use one of a plurality of LCIDs as an input parameter of a security algorithm.

In this implementation, an AS stratum of the second terminal or an upper layer of the second terminal may determine to use one of the LCIDs corresponding to the plurality of LCHs associated with the second PDCP entity as an input parameter of the security algorithm of the second PDCP entity. The AS stratum may include one or more of a PDCP layer, an RLC layer, a MAC layer, a physical (PHY) layer, a service data adaptation protocol (SDAP) layer, and a radio resource control (RRC) layer. The upper layer of the second terminal may be a layer above the AS stratum of the second terminal, for example, a PC5-S layer of the second terminal or a V2X layer of the second terminal.

For example, in this implementation, when the second terminal includes a plurality of second PDCP entities, sizes of first LCIDs corresponding to all second PDCP entities in the second terminal may meet a same first preset condition. For example, the second terminal may determine a smallest LCID in LCIDs corresponding to LCHs associated with each second PDCP entity as a first LCID corresponding to the PDCP entity. For another example, the second terminal may determine a largest LCID in LCIDs corresponding to LCHs associated with each second PDCP entity as a first LCID corresponding to the PDCP entity.

For example, in this implementation, when the second terminal includes a plurality of second PDCP entities, sizes of first LCIDs corresponding to different second PDCP entities in the second terminal may meet different first preset conditions. For example, the second terminal includes two second PDCP entities: a PDCP 1 and a PDCP 2. The second terminal may determine a smallest LCID in LCIDs corresponding to LCHs associated with the PDCP 1 as a first LCID corresponding to the PDCP 1, that is, use the smallest LCID in the LCIDs corresponding to the LCHs associated with the PDCP 1 as an input parameter of a security algorithm of the PDCP 1; and determine a largest LCID in LCIDs corresponding to LCHs associated with the PDCP 2 is a first LCID corresponding to the PDCP 2, that is, use the largest LCID in the LCIDs corresponding to the LCHs associated with the PDCP 2 as an input parameter of a security algorithm of the PDCP 2. That is, for different second PDCP entities of the second terminal, sizes of first LCIDs may meet different first preset conditions.

It should be noted that whether first LCIDs corresponding to different second PDCP entities of the second terminal meet a same first preset condition is not limited in this embodiment of this application.

It may be understood that, in this implementation, after determining that an LCID meeting the first preset condition is the first LCID, the second terminal may send indication information to the first terminal, to notify a corresponding first PDCP entity in the first terminal of an LCID that is used as an input parameter of a security algorithm of the first PDCP entity, to ensure that input parameters used when corresponding PDCP entities of the second terminal and the first terminal execute security algorithms are consistent.

In a third implementation, before step S401, the method may further include: The second terminal receives third indication information from a network device, where the third indication information is used to indicate the second terminal to use the LCID meeting the first preset condition as the input parameter of the security algorithm of the second PDCP entity. Correspondingly, step S401 includes: The second terminal determines, based on the third indication information, the first LCID meeting the first preset condition. For example, the network device may be an access network device or a core network device. This is not limited in this embodiment of this application.

For example, the third indication information indicates the second terminal to use a smallest LCID as the input parameter of the security algorithm of the second PDCP entity. The second terminal may determine, based on the third indication information, a smallest LCID in the LCIDs corresponding to the two or more LCHs associated with the second PDCP as the LCID meeting the first preset condition. That is, the second terminal may determine, based on the third indication information of the network device, the LCID meeting the first preset condition.

For example, the first preset condition is that an LCID is the smallest. The third indication information may indicate the second terminal to determine a smallest LCID in LCIDs corresponding to two or more LCHs associated with each second PDCP entity as an input parameter of a security algorithm of the second PDCP entity. Alternatively, the third indication information may indicate the second terminal to determine a smallest LCID in LCIDs corresponding to two or more LCHs associated with a second PDCP entity as an input parameter of a security algorithm of the second PDCP entity. That is, a granularity indicated by the third indication information may be all second PDCP entities of the second terminal, or may be one second PDCP entity. When the granularity indicated by the third indication information is one second PDCP entity, sizes of first LCIDs corresponding to different second PDCP entities may meet different first preset conditions.

Optionally, the third indication information may further include the first LCID. To be specific, the network device indicates, based on the third indication information, the second terminal to use a first LCID that meets the preset condition and that is determined by the network device as the input parameter of the security algorithm of the second PDCP entity of the second terminal.

For example, the third indication information may be carried in third sidelink radio bearer (SLRB) configuration information, and the third SLRB configuration information may include one or more of service data adaptation layer (SDAP) configuration information, PDCP configuration information, radio link control (RLC) configuration information, LCH configuration information, an SLRB ID/index, and an LCID/LCH index. When the third indication information may be carried in the third SLRB configuration information, the third indication information in the third SLRB configuration information is used to indicate the second terminal to determine, as an input parameter of a security algorithm of a second PDCP entity corresponding to an SLRB, an LCID whose size meets the first preset condition in LCIDs corresponding to two or more LCHs associated with the second PDCP entity.

It may be understood that the SLRB index is an index corresponding to SLRB configuration information, and the LCH index is an index corresponding to an LCH configuration.

For example, the third SLRB configuration information may be carried in an RRC message, a system information block (SIB), or a pre-configured message.

Optionally, the third indication information may further include identification information of the first terminal. When the third indication information includes the identification information of the first terminal, the third indication information is specifically used to indicate the second terminal to use an LCID meeting the first preset condition in unicast connection communication between the second terminal and the first terminal as the input parameter of the security algorithm of the second PDCP entity. It may be understood that, in different unicast connection communication of the second terminal, LCIDs corresponding to LCHs associated with different PDCP entities of the second terminal may be the same. When the network device indicates the second terminal to use the LCID meeting the first preset condition as an input parameter of a security algorithm of a PDCP entity of the second terminal, the second terminal may be indicated to use an LCID whose LCID size meets a condition in unicast connection communication as the input parameter of the security algorithm of the PDCP entity of the second terminal. For example, the identification information of the first terminal may be a source layer 2 identifier (source L2 ID) of the first terminal.

It may be understood that, when the third indication information does not include the identification information of the first terminal, the second terminal may not distinguish between specific unicast connections when determining the LCID meeting the first preset condition. For example, the first preset condition is that an LCID is the smallest. The second terminal may use a smallest LCID in LCIDs corresponding to LCHs associated with each second PDCP entity of the second terminal in a unicast connection between the second terminal and the first terminal as an input parameter used by the second PDCP entity to execute a security algorithm. For another example, the second terminal may use a smallest LCID in LCIDs corresponding to LCHs associated with each second PDCP entity of the second terminal in a unicast connection between the second terminal and a third terminal as an input parameter used by the second PDCP entity to execute a security algorithm. In other words, when determining the first LCID, the second terminal does not distinguish between different unicast connections.

For example, the preset condition may include a second preset condition. An LCH configuration parameter corresponding to the first LCID meets the second preset condition. To be specific, the first LCID may be an LCID corresponding to an LCH whose LCH configuration parameter meets the second preset condition in the two or more LCHs associated with the second PDCP entity of the second terminal.

For example, the LCH configuration parameter may include one or more of parameters such as an LCH priority, a logical channel identifier (LCID), a prioritised bit rate (PBR), a token bucket size duration (BSD), a carrier (allowed carriers), a subcarrier spacing (SCS), a maximum physical sidelink shared channel (PSSCH) support duration (maxPSSCH-duration), a configured grant type1 allowed (CG), a logical channel group identifier (LCG ID), and a scheduling request identifier (SR ID). For example, the second preset condition may be that an LCH has a highest priority. For another example, the second preset condition may be an LCH associated with a CG. A specific parameter included in the LCH configuration parameter and specific content of the second preset condition are not limited in this embodiment of this application. This is merely an example for description herein. It should be understood that the LCH configuration parameter may be in a form of a list or a set. For example, an SCS parameter in the LCH configuration parameter is an SCS list.

In a fourth implementation, step S401 may include: The second terminal determines, according to a preset rule, a first LCID meeting the second preset condition. The preset rule is a predefined rule. "Predefine" in this application may be understood as "define", "define in advance", "store", "pre-store", "pre-negotiate", "pre-configure", "solidify", or "pre-burn". For example, the preset rule may be a rule specified in a protocol, and the second terminal may determine, according to the rule specified in the protocol, the LCID meeting the second preset condition.

For example, as specified in a protocol, an LCID corresponding to a highest-priority LCH in the two or more LCHs associated with the second PDCP entity of the second terminal may be used as the input parameter of the security algorithm of the second PDCP entity. In this implementation, if the second terminal includes a plurality of second PDCP entities, each second PDCP entity uses, as an input parameter of a security algorithm of the second PDCP entity, an LCID corresponding to a highest-priority LCH in LCHs associated with the second PDCP entity. To be specific, each second PDCP entity included in the second terminal determines, according to the preset rule, an LCID corresponding to an LCH whose LCH configuration parameter meets the second preset condition in LCHs associated with the second PDCP entity.

It may be understood that in this implementation, the second terminal and the first terminal each may determine, according to a preset rule specified in a protocol, an LCID used as an input parameter of a security algorithm, and an LCH associated with a PDCP entity of the second terminal corresponds to an LCH associated with a PDCP entity of the first terminal. Therefore, when corresponding PDCP entities execute security algorithms according to the rule, input parameters of the security algorithms are the same for the second terminal and the first terminal. In this implementation, consistency in input parameters used when the corresponding PDCP entities of the second terminal and the first terminal execute the security algorithms can be ensured without a need of exchanging the rule between the second terminal and the first terminal.

In a fifth implementation, step S401 may include: The second terminal determines, based on LCH configuration parameters of the two or more LCHs, a first LCID meeting the second preset condition. For example, in this implementation, the second terminal may autonomously determine, based on the LCH configuration parameter, the LCID that is used as the input parameter of the security algorithm.

For example, in this implementation, when the second terminal includes a plurality of second PDCP entities, the second terminal may use an LCID that corresponds to an LCH and that meets the second preset condition in LCH configuration parameters of LCHs associated with each second PDCP entity as an input parameter of a security algorithm of the second PDCP entity. Alternatively, the second terminal may use LCIDs that correspond to an LCH and that meet different second preset conditions in LCH configuration parameters of LCHs associated with different second PDCP entities as input parameters of security algorithms of the second PDCP entities. That is, LCH configuration parameters of first LCIDs corresponding to all second PDCP entities in the second terminal may meet a same second preset condition. Alternatively, LCH configuration parameters of first LCIDs corresponding to different second PDCP entities in the second terminal may meet different second preset conditions.

For example, the second terminal may determine an LCID corresponding to a highest-priority LCH in LCH configuration parameters of LCHs associated with each second PDCP entity as a first LCID corresponding to the PDCP entity. For another example, the second terminal includes two second PDCP entities: a PDCP 1 and a PDCP 2. The second terminal may determine an LCID corresponding to a highest-priority LCH in LCH configuration parameters associated with the PDCP 1 as a first LCID corresponding to the PDCP 1, that is, uses the LCID corresponding to the highest-priority LCH in the LCH configuration parameters associated with the PDCP 1 as an input parameter of a security algorithm of the PDCP 1; and determine an LCID corresponding to an LCH associated with a CG in LCH configuration parameters associated with the PDCP 2 as a first LCID corresponding to the PDCP 2, that is, uses the LCID corresponding to the LCH associated with the CG in the LCH configuration parameters associated with the PDCP 2 as an input parameter of a security algorithm of the PDCP 2.

It should be noted that whether first LCID corresponding to different second PDCP entities of the second terminal meet a same second preset condition is not limited in this embodiment of this application.

It may be understood that, in this implementation, after determining that an LCID meeting the second preset condition is the first LCID, the second terminal may send indication information to the first terminal, to notify a corresponding first PDCP entity in the first terminal to use the LCID as an input parameter of a security algorithm of the first PDCP entity, to ensure that input parameters used when corresponding PDCP entities of the second terminal and the first terminal execute security algorithms are consistent.

In a sixth implementation, before step S401, the method may further include: The second terminal receives fourth indication information from a network device, where the fourth indication information includes a target LCH configuration parameter, and the fourth indication information is used to indicate the second terminal to use an LCID meeting the second preset condition as the input parameter of the security algorithm of the second PDCP entity, and the LCID meeting the second preset condition is an LCID corresponding to the target LCH configuration parameter. Correspondingly, step S401 includes: The second terminal determines, based on the fourth indication information, the first LCID meeting the second preset condition. For example, the network device may be an access network device or a core network device. This is not limited in this embodiment of this application.

For example, the fourth indication information indicates the second terminal to use an LCID corresponding to a highest-priority LCH as the input parameter of the security algorithm of the second PDCP entity. The second terminal may determine, based on the fourth indication information, an LCID corresponding to a highest-priority LCH in LCH configuration parameters of the two or more LCHs associated with the second PDCP as an LCID meeting the second preset condition. That is, the second terminal may determine, based on the fourth indication information of the network device, the LCID meeting the second preset condition.

For example, the second preset condition is that an LCH has a highest priority. The fourth indication information may indicate the second terminal to determine an LCID corresponding to a highest-priority LCH in LCH configuration parameters of two or more LCHs associated with each second PDCP entity as an input parameter of a security algorithm of the second PDCP entity. Alternatively, the fourth indication information may indicate the second terminal to determine an LCID corresponding to a highest-priority LCH in LCH configuration parameters of two or more LCHs associated with a second PDCP entity as an input parameter of a security algorithm of the second PDCP entity. That is, a granularity indicated by the fourth indication information may be all second PDCP entities of the second terminal, or may be one second PDCP entity. When the granularity indicated by the fourth indication information is one second PDCP entity, LCH configuration parameters of first LCIDs corresponding to different second PDCP entities may meet different second preset conditions.

For example, the fourth indication information may be carried in fourth SLRB configuration information, the fourth SLRB configuration information may include one or more of SDAP configuration information, PDCP configuration information, RLC configuration information, LCH configuration information, an SLRB ID/index, and an LCID/LCH index. When the fourth indication information is carried in the fourth SLRB configuration information, the fourth indication information in the fourth SLRB configuration information is used to indicate the second terminal to determine, as an input parameter of a security algorithm of a second PDCP entity corresponding to an SLRB, an LCID corresponding to an LCH whose LCH configuration parameter meets the second preset condition in two or more LCHs associated with the second PDCP entity.

For example, the fourth SLRB configuration information may be carried in an RRC message, a SIB, or a pre-configured message.

It may be understood that in this embodiment, the second terminal may determine, in a plurality of implementations, an LCID meeting a preset condition. A specific manner used by the second terminal to determine the LCID meeting the preset condition is not limited in this embodiment of this application.

S402. The first terminal determines a second LCID meeting a preset condition.

A first PDCP entity of the first terminal is associated with two or more LCHs. The first PDCP entity of the first terminal corresponds to a second PDCP entity of the second terminal. An LCH associated with the first PDCP entity of the first terminal corresponds to an LCH associated with the second PDCP entity of the second terminal.

For example, the preset condition in step S402 may be the same as the preset condition in step S401. Therefore, for a corresponding group of PDCP entities of the second terminal and the first terminal, the second LCID that meets the preset condition and that is determined by the first terminal in step S402 is the same as the first LCID that meets the preset condition and that is determined by the second terminal in step S401. The second LCID meeting the preset condition may be used as an input parameter used by the first PDCP entity of the first terminal to execute a security algorithm. That is, the first LCID that is used as the input parameter of the security algorithm of the second PDCP entity and that is determined by the second terminal in step S401 is the same as the second LCID that is used as the input parameter of the security algorithm of the first PDCP entity and that is determined by the first terminal in step S402.

For example, the preset condition may include a first preset condition. A size of the second LCID meets the first preset condition. The second LCID may be an LCID that is in the LCIDs corresponding to the two or more LCHs associated with the first PDCP entity of the first terminal and whose LCID size meets the first preset condition.

For example, the first preset condition may be that an LCID is the largest, an LCID is the smallest, an LCID is the second largest, an LCID is the second smallest, or the like. For example, when the first preset condition is that an LCID is the largest, the second LCID is a largest LCID in the LCIDs corresponding to the two or more LCHs associated with the first PDCP entity of the first terminal. When the first preset condition is that an LCID is the smallest, the second LCID is a smallest LCID in the LCIDs corresponding to the two or more LCHs associated with the first PDCP entity of the first terminal. When the first preset condition is that an LCID is the second smallest, the second LCID is a second smallest LCID in the LCID corresponding to the two or more LCHs associated with the first PDCP entity of the first terminal. When the first preset condition is that an LCID is the second largest, the second LCID is a second largest LCID in the LCID corresponding to the two or more LCHs associated with the first PDCP entity of the first terminal. The first preset condition that the size of the second LCID specifically meets is not limited in this embodiment of this application. It should be noted that the first preset condition that the size of the second LCID meets is the same as the first preset condition that the size of the first LCID meets in the foregoing step.

In a first implementation, step S402 may include: The first terminal determines, according to a preset rule, a second LCID meeting the first preset condition. The preset rule is a predefined rule. For example, the preset rule may be a rule specified in a protocol, and the first terminal may determine, according to the rule specified in the protocol, the second LCID meeting the first preset condition.

For example, as specified in the protocol, a largest LCID or a smallest LCID in LCIDs corresponding to two or more LCHs associated with a PDCP entity of a terminal may be used as an input parameter of a security algorithm of the PDCP entity. In this implementation, if the first terminal includes a plurality of first PDCP entities, each first PDCP entity uses a largest LCID or a smallest LCID in LCIDs corresponding to LCHs associated with the first PDCP entity as an input parameter of a security algorithm of the first PDCP entity. To be specific, each first PDCP entity included in the first terminal determines, according to the preset rule, a second LCID that is in LCIDs corresponding to LCHs associated with the second PDCP entities and whose size meets the first preset condition.

It should be noted that when as specified in a protocol, a largest LCID or a smallest LCID is used as an input parameter of a security algorithm, each terminal may determine, based on the specification, to use a largest LCID or a smallest LCID in LCIDs corresponding to a plurality of LCHs associated with a PDCP entity of the terminal as an input parameter of a security algorithm of the PDCP entity.

It may be understood that in this implementation, the second terminal and the first terminal may determine, based on a same preset rule specified in a protocol, the LCID that is used as the input parameter of the security algorithm, and LCIDs of the second terminal and the first terminal are in a one-to-one correspondence. Therefore, when corresponding PDCP entities execute security algorithms according to the rule, input parameters of the security algorithm are the same for the second terminal and the first terminal. This ensures consistency in input parameters used when corresponding PDCP entities of the second terminal and the first terminal execute security algorithms.

In a second implementation, before step S402, the method may further include: The first terminal receives first indication information from the second terminal, where the first indication information is used to indicate the first terminal to use a second LCID meeting the first preset condition as the input parameter of the security algorithm of the first PDCP entity. Correspondingly, step S402 includes: The first terminal determines, based on the first indication information, the second LCID meeting the first preset condition.

For example, the first indication information indicates the first terminal to use a smallest LCID as the input parameter of the security algorithm of the first PDCP entity. The first terminal may determine, based on the first indication information, a smallest LCID in the LCIDs corresponding to the two or more LCHs associated with the second PDCP as the second LCID meeting the first preset condition. That is, the first terminal may determine, based on the first indication information of the second terminal, the second LCID meeting the first preset condition.

Optionally, the first indication information may further include the first LCID. To be specific, the second terminal directly indicates, based on the first indication information, the first terminal to use the first LCID that meets the preset condition and that is determined by the second terminal as the input parameter of the security algorithm of the first PDCP entity of the first terminal.

For example, the first preset condition is that an LCID is the smallest. The first indication information may indicate the first terminal to determine a smallest LCID in LCIDs corresponding to two or more LCHs associated with each first PDCP entity as an input parameter of a security algorithm of the first PDCP entity. Alternatively, the first indication information may indicate the first terminal to determine a smallest LCID in LCIDs corresponding to two or more LCHs associated with a first PDCP entity as an input parameter of a security algorithm of the first PDCP entity. That is, a granularity indicated by the first indication information may be all first PDCP entities of the first terminal, or may be one first PDCP entity. When the granularity indicated by the first indication information is one first PDCP entity, sizes of second LCIDs corresponding to different first PDCP entities may meet different first preset conditions.

For example, the first indication information may be carried in first SLRB configuration information, the first SLRB configuration information may include one or more of SDAP configuration information, PDCP configuration information, RLC configuration information, LCH configuration information, an SLRB ID/index, and an LCID/LCH index. When the first indication information is carried in the first SLRB configuration information, the first indication information in the first SLRB configuration information is used to indicate the first terminal to determine, as an input parameter of a security algorithm of a first PDCP entity corresponding to an SLRB, an LCID whose size meets the first preset condition in LCIDs corresponding to two or more LCHs associated with the first PDCP entity.

For example, the first SLRB configuration information may be carried in a PC5-RRC message.

For example, the preset condition may include a second preset condition. An LCH configuration parameter corresponding to the second LCID meets the second preset condition. To be specific, the second LCID may be an LCID corresponding to an LCH whose LCH configuration parameter meets the second preset condition in the two or more LCHs associated with the first PDCP entity of the first terminal. For specific content of the LCH configuration parameter and the second preset condition, refer to related descriptions in step S401. Details are not described herein again.

In a third implementation, step S402 may include: The first terminal determines, according to a preset rule, a second LCID meeting the second preset condition. The preset rule is a predefined rule. For example, the preset rule may be a rule specified in a protocol, and the first terminal may determine, according to the rule specified in the protocol, the second LCID meeting the second preset condition.

For example, as specified in a protocol, an LCID corresponding to a highest-priority LCH in two or more LCHs associated with a PDCP entity may be used as an input parameter of a security algorithm of the PDCP entity. In this implementation, if the first terminal includes a plurality of first PDCP entities, each first PDCP entity uses, as an input parameter of a security algorithm of the first PDCP entity, an LCID corresponding to a highest-priority LCH in LCHs associated with the first PDCP entity. To be specific, each first PDCP entity included in the first terminal determines, according to the preset rule, an LCID corresponding to an LCH whose LCH configuration parameter meets the second preset condition in LCHs associated with the first PDCP entity.

It should be noted that, in this implementation, when both the first terminal and the second terminal determine the LCID based on the LCH configuration parameter, the LCH configuration parameter of the first terminal is a configuration parameter obtained from the second terminal. Therefore, the LCH configuration parameter associated with the first PDCP entity of the first terminal is the same as the LCH configuration parameter associated with the second PDCP entity of the second terminal. Therefore, when the second terminal and the first terminal determine, according to the preset rule specified in the protocol, the LCIDs used as the input parameters of the security algorithms, the LCIDs are the same. This ensures consistency in input parameters used when corresponding PDCP entities of the second terminal and the first terminal execute security algorithms.

In a fourth implementation, before step S402, the method may further include: The first terminal receives second indication information from the second terminal, where the second indication information includes the first LCID, the second indication information is used to indicate the first terminal to use the first LCID as the input parameter of the security algorithm of the first PDCP entity, and the first LCID is an LCID that corresponds to an LCH, that meets the second preset condition, and that is determined by the second terminal. Correspondingly, step S402 includes: The first terminal determines, based on the second indication information, the first LCID meeting the second preset condition. That is, in this implementation, the second terminal may send, to the first terminal, the first LCID that meets the preset condition and that is determined by the second terminal, and indicate the first terminal to use the first LCID as the input parameter of the security algorithm of the first PDCP entity of the first terminal. That is, the second LCID is the first LCID.

Optionally, the second indication information may further include a target LCH configuration parameter, and the target LCH configuration parameter meets the second preset condition. For example, the second indication information includes that an LCH has a highest priority, and the second indication information may indicate the first terminal to use an LCID corresponding to a highest-priority LCH as the input parameter of the security algorithm of the first PDCP entity.

For example, the second preset condition is that an LCH has a highest priority. The second indication information may indicate the first terminal to determine an LCID corresponding to a highest-priority LCH in LCH configuration parameters of two or more LCHs associated with each first PDCP entity as an input parameter of a security algorithm of the first PDCP entity. Alternatively, the second indication information may indicate the first terminal to determine an LCID corresponding to a highest-priority LCH in LCH configuration parameters of two or more LCHs associated with a first PDCP entity as an input parameter of a security algorithm of the first PDCP entity. That is, a granularity indicated by the second indication information may be all first PDCP entities of the first terminal, or may be one first PDCP entity. When the granularity indicated by the second indication information is one first PDCP entity, LCH configuration parameters of second LCIDs corresponding to different first PDCP entities may meet different second preset conditions.

For example, the second indication information may be carried in second SLRB configuration information, the second SLRB configuration information may include one or more of SDAP configuration information, PDCP configuration information, RLC configuration information, LCH configuration information, an SLRB ID/index, and an LCID/LCH index. When the second indication information is carried in the second SLRB configuration information, the second indication information in the second SLRB configuration information is used to indicate the first terminal to determine, as an input parameter of a security algorithm of a first PDCP entity corresponding to an SLRB, an LCID corresponding to an LCH whose LCH configuration parameter meets the second preset condition in two or more LCHs associated with the first PDCP entity.

For example, the second SLRB configuration information may be carried in a PC5-RRC message.

It may be understood that in this embodiment, the first terminal may determine, in a plurality of implementations, an LCID meeting a preset condition. A specific manner used by the first terminal to determine the LCID meeting the preset condition is not limited in this embodiment of this application. It should be noted that, the second LCID that meets the preset condition and that is determined by the first terminal in this embodiment is the same as the first LCID that meets the preset condition and that is determined by the second terminal.

It should be noted that when the second terminal determines the first LCID according to the preset rule specified in the protocol, an execution sequence of steps S401 and S402 is not limited in this embodiment of this application. For example, S401 may be performed before or after S402, or S401 may be performed simultaneously with S402. When the second terminal independently determines the first LCID, or when the second terminal determines the first LCID based on the indication information of the network device, step S402 is performed after step S401.

It should be noted that, when the second terminal determines the first LCID based on the fifth implementation or the sixth implementation in step S401, in step S402, the first terminal may determine the second LCID based on the fourth implementation, or may determine the second LCID based on the second implementation. When the first terminal determines the second LCID based on the second implementation in step S402, the first indication information includes the first LCID, to ensure that the first LCID determined by the second terminal is the same as the second LCID determined by the first terminal.

S403. The second terminal uses the first LCID as the input parameter of the security algorithm of the second PDCP entity to perform security protection on a first data packet.

For example, that the second terminal performs security protection on the first data packet may include: The second PDCP entity of the second terminal performs encryption and/or integrity protection on the first data packet.

For example, when the preset condition includes the first preset condition, correspondingly, in step S403, the second terminal may use the LCID that meets the first preset condition and that is determined in step S401 as the input parameter of the security algorithm of the second PDCP entity to perform security protection on the first data packet.

For example, when the preset condition includes the second preset condition, correspondingly, in step S403, the second terminal may use the LCID that meets the second preset condition and that is determined in step S401 as the input parameter of the security algorithm of the second PDCP entity to perform security protection on the first data packet.

It should be noted that, in this embodiment of this application, the LCID meeting the preset condition is also an input parameter used when the first PDCP entity of the first terminal parses the first data packet, and the first PDCP entity of the first terminal corresponds to the second PDCP entity of the second terminal. Therefore, this can ensure that input parameters of the second terminal and the first terminal are consistent when corresponding PDCP entities perform a security algorithm, so that SL communication between the second terminal and the first terminal is normal.

It may be understood that, in this embodiment, the second terminal may determine, based on a plurality of implementations, the LCID meeting the preset condition, and use the LCID meeting the preset condition as the input parameter used by the second PDCP entity of the second terminal to execute the security algorithm, to perform security protection on the first data packet.

S404. The second terminal sends the first data packet on which security protection is performed to the first terminal.

S405. The first terminal receives the first data packet on which security protection is performed.

S406. The first PDCP entity of the first terminal parses, based on the second LCID, the first data packet on which security protection is performed.

For example, that the first PDCP entity of the first terminal parses, based on the second LCID, the first data packet on which security protection is performed includes: The first PDCP entity of the first terminal performs decryption and/or integrity check on the first data packet based on the second LCID.

For example, the second LCID that meets the preset condition and that is determined by the first terminal in step S402 is the same as the first LCID that meets the preset condition and that is determined by the second terminal. Therefore, when the first PDCP entity of the first terminal parses the first data packet based on the second LCID in step S406, because the second LCID is the same as the input parameter used when the second terminal performs security protection on the first data packet, the first terminal can normally parse the first data packet.

Figure 4:
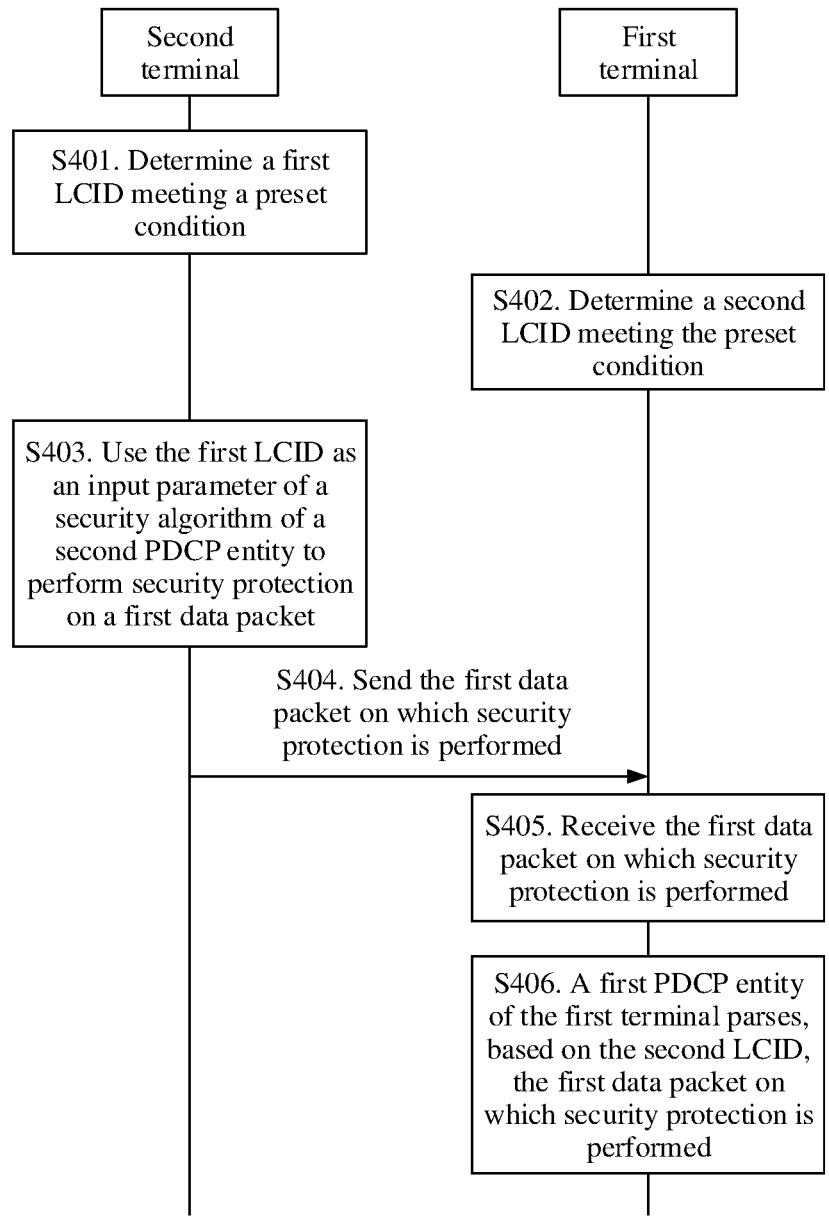
FIG. 4 is a schematic flowchart of a communication method according to an embodiment of this application.

It should be noted that an execution sequence of step S402 and steps S403 to S405 is not limited in this embodiment of this application. For example, step S402 may be performed before or after steps S403 to S405, or may be performed at any time when steps S403 to S405 are performed. In FIG. 4, only an example in which step S402 is performed before steps S403 to S405 is used for description.

It may be understood that, in this embodiment of this application, when the second PDCP entity of the second terminal and the first PDCP entity of the first terminal each are associated with a plurality of LCHs, the second terminal determines the first LCID meeting the preset condition, and the first terminal determines the second LCID meeting the same preset condition. In addition, the first LCID is the same as the second LCID. In this way, consistency in input parameters can be ensured when the corresponding PDCP entities of the second terminal and the first terminal execute security algorithms. Therefore, the first terminal can normally parse the data packet on which security protection is performed and that is sent by the second terminal, so that normal communication can be performed on an SL between the first terminal and the second terminal.

Figure 5:
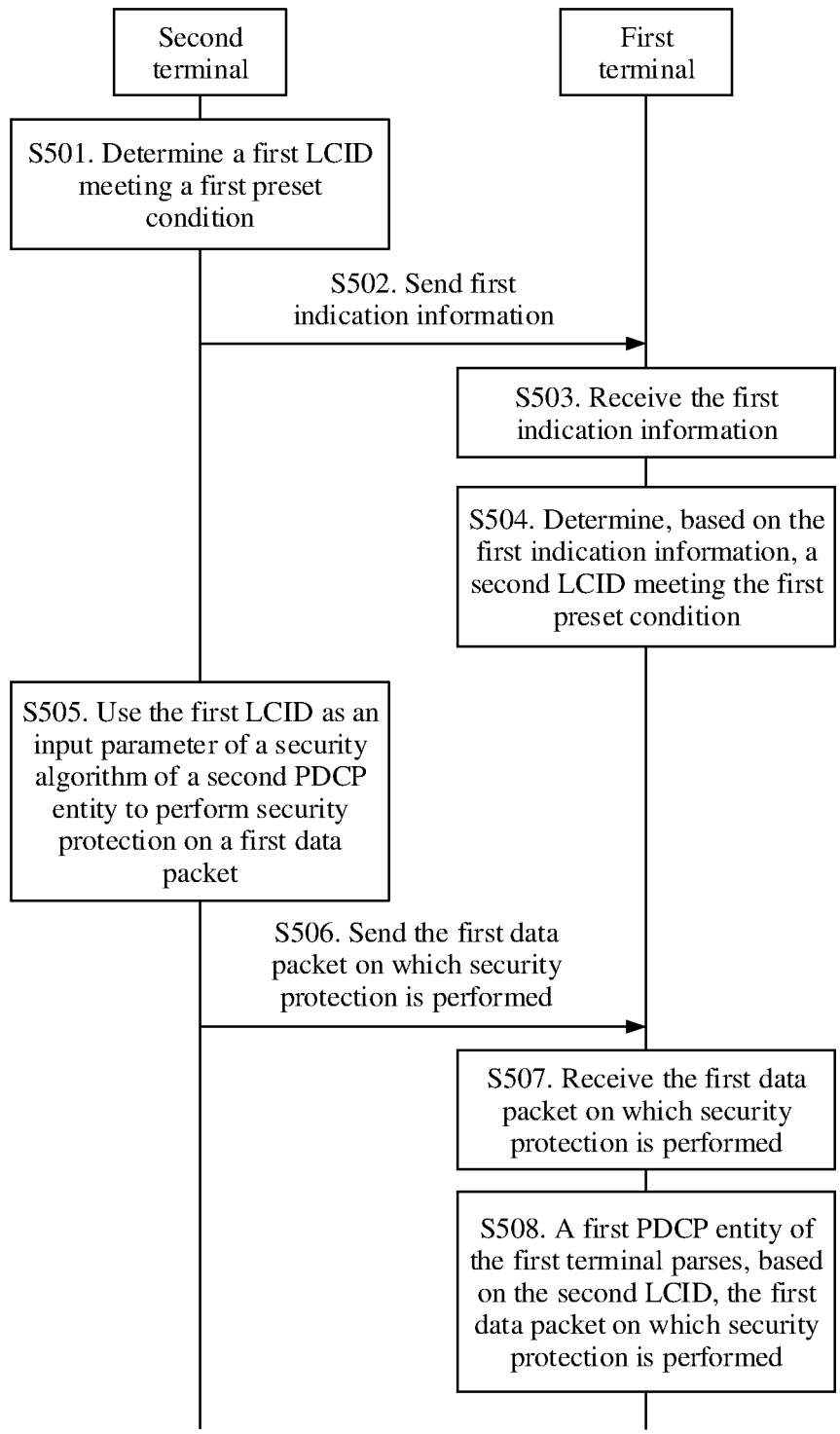
FIG. 5 is a schematic flowchart of another communication method according to an embodiment of this application.

For example, an embodiment of this application further provides a communication method. The communication method corresponds to the second implementation in step S401 and the second implementation in step S402. As shown in FIG. 5, the method includes steps S501 to S508.

S501. A second terminal determines a first LCID meeting a first preset condition.

It may be understood that, for a specific implementation of step S501, refer to the second implementation in step S401. Details are not described herein again.

S502. The second terminal sends first indication information to a first terminal.

The first indication information is used to indicate the first terminal to use the LCID meeting the first preset condition as an input parameter of a security algorithm of a first PDCP entity.

S503. The first terminal receives the first indication information.

S504. The first terminal determines, based on the first indication information, a second LCID meeting the first preset condition.

It may be understood that, for a specific implementation of step S504, refer to the second implementation in step S402. Details are not described herein again.

S505. The second terminal uses the first LCID as an input parameter of a security algorithm of the second PDCP entity to perform security protection on a first data packet.

S506. The second terminal sends the first data packet on which security protection is performed to the first terminal.

S507. The first terminal receives the first data packet on which security protection is performed.

S508. The first PDCP entity of the first terminal parses, based on the second LCID, the first data packet on which security protection is performed.

It may be understood that, for specific implementations of steps S505 to S508, refer to steps S403 to S406. Details are not described herein again.

It should be noted that an execution sequence of steps S502 to S504 and steps S505 to S507 is not limited in this embodiment. For example, steps S502 to S504 may be performed before or after steps S505 to S507, or may be performed at any time when steps S505 to S507 are performed. In FIG. 5, only an example in which steps S502 to S504 are performed before steps S505 to S507 is used for description.

It may be understood that, in this embodiment, the second terminal independently determines the first LCID based on sizes of LCIDs corresponding to two or more LCHs associated with the second PDCP entity, and sends the first indication information to the first terminal, to indicate the first terminal to use the LCID meeting the first preset condition as the input parameter of the security algorithm of the first PDCP entity. In this way, consistency in input parameters can be ensured when the corresponding PDCP entities of the second terminal and the first terminal execute the security algorithm. Therefore, the first terminal can normally parse the data packet on which security protection is performed and that is sent by the second terminal, so that normal communication can be performed on an SL between the first terminal and the second terminal.

Figure 6:
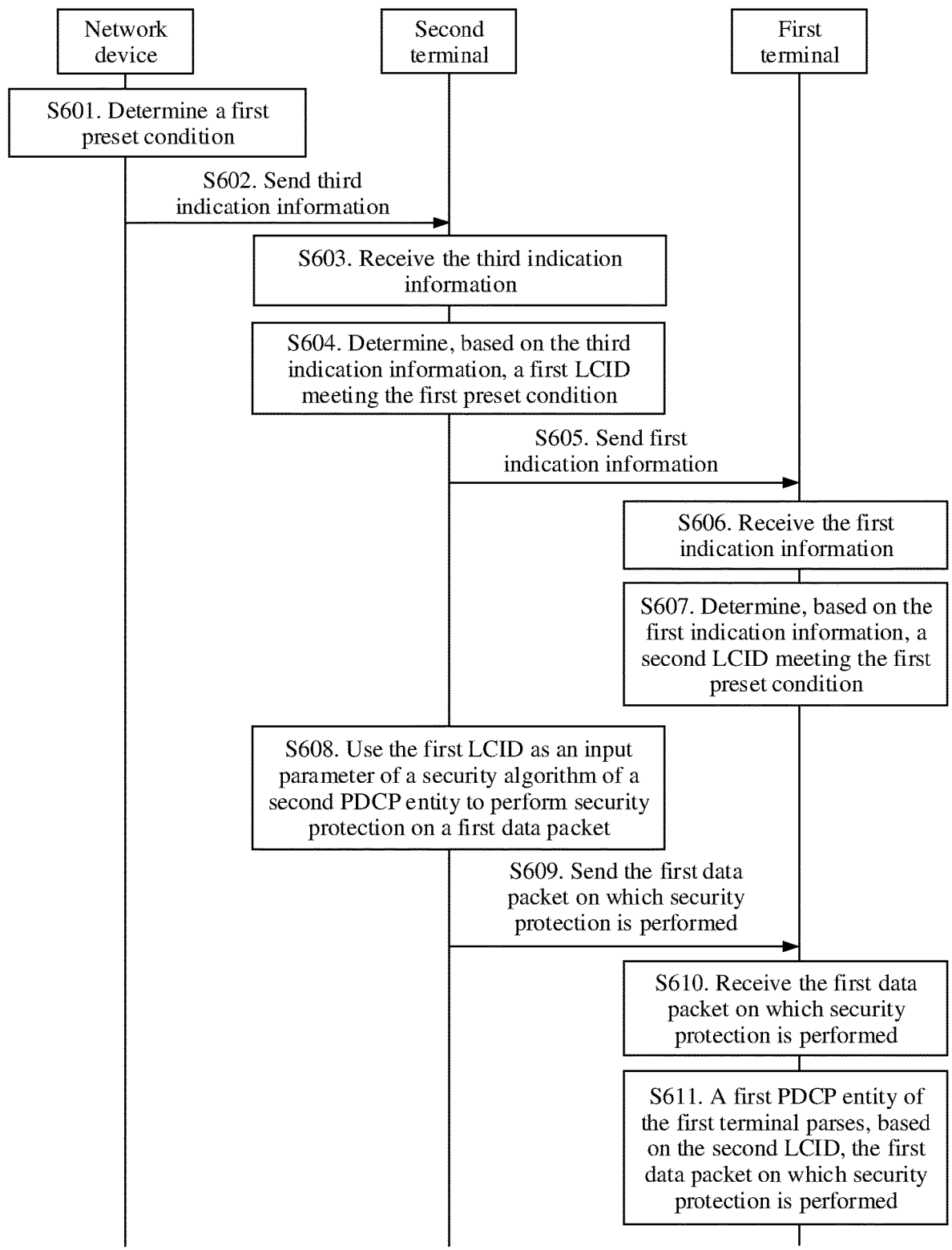
FIG. 6 is a schematic flowchart of another communication method according to an embodiment of this application.

For example, an embodiment of this application further provides a communication method. The communication method corresponds to the third implementation in step S401 and the second implementation in step S402. As shown in FIG. 6, the method includes steps S601 to S611.

S601. A network device determines a first preset condition.

For example, the network device may be an access network device or a core network device. This is not limited in this embodiment of this application.

For related content of the first preset condition, refer to related descriptions in step S401. Details are not described herein again.

S602. The network device sends third indication information to a second terminal.

The third indication information is used to indicate the second terminal to use an LCID meeting the first preset condition as an input parameter of a security algorithm of a second PDCP entity.

The second PDCP entity of the second terminal is associated with two or more logical channels (LCHs).

S603. The second terminal receives the third indication information.

S604. The second terminal determines, based on the third indication information, a first LCID meeting the first preset condition.

It may be understood that, for a specific implementation of step S604, refer to the third implementation in step S401. Details are not described herein again.

S605. The second terminal sends first indication information to a first terminal.

The first indication information is used to indicate the first terminal to use the first LCID meeting the first preset condition as an input parameter of a security algorithm of a first PDCP entity.

S606. The first terminal receives the first indication information.

S607. The first terminal determines, based on the first indication information, a second LCID meeting the first preset condition.

It may be understood that, for a specific implementation of step S607, refer to the second implementation in step S402. Details are not described herein again.

S608. The second terminal uses the first LCID as the input parameter of the security algorithm of the second PDCP entity to perform security protection on a first data packet.

S609. The second terminal sends the first data packet on which security protection is performed to the first terminal.

S610. The first terminal receives the first data packet on which security protection is performed.

S611. The first PDCP entity of the first terminal parses, based on the second LCID, the first data packet on which security protection is performed.

It may be understood that, for specific implementations of steps S608 to S611, refer to steps S403 to S406. Details are not described herein again.

It should be noted that an execution sequence of steps S605 to S607 and steps S608 to S610 is not limited in this embodiment. For example, steps S605 to S607 may be performed before or after steps S608 to S610, or may be performed at any time when steps S608 to S610 are performed. In FIG. 6, only an example in which steps S605 to S607 are performed before steps S608 to S610 is used for description.

It may be understood that, in this embodiment, the second terminal receives the third indication information sent by the network device, determines, based on the third indication information, the first LCID meeting the first preset condition, and sends the first indication information to the first terminal, to indicate the first terminal to use the LCID meeting the first preset condition as the input parameter of the security algorithm of the first PDCP entity. In this way, consistency in input parameters can be ensured when the corresponding PDCP entities of the second terminal and the first terminal execute the security algorithm. Therefore, the first terminal can normally parse the data packet on which security protection is performed and that is sent by the second terminal, so that normal communication can be performed on an SL between the first terminal and the second terminal.

Figure 7:
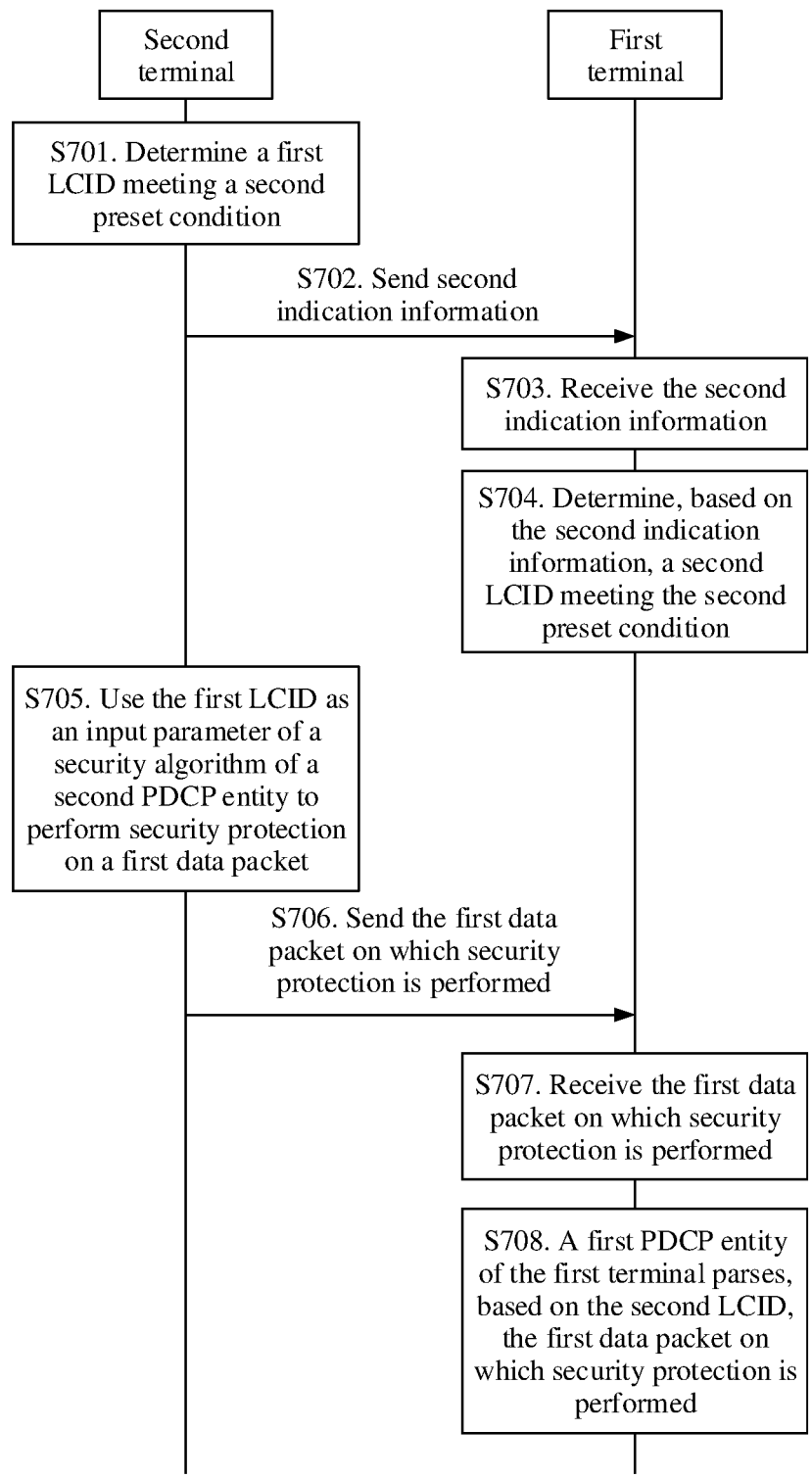
FIG. 7 is a schematic flowchart of another communication method according to an embodiment of this application.

For example, an embodiment of this application further provides a communication method. The communication method corresponds to the fifth implementation in step S401 and the fourth implementation in step S402. As shown in FIG. 7, the method includes steps S701 to S708.

S701. A second terminal determines a first LCID meeting a second preset condition.

It may be understood that, for a specific implementation of step S701, refer to the fifth implementation in step S401. Details are not described herein again.

S702. The second terminal sends second indication information to a first terminal.

The second indication information includes the first LCID, and the second indication information is used to indicate the first terminal to use the first LCID as an input parameter of a security algorithm of a first PDCP entity. The first LCID is an LCID that corresponds to an LCH, that meets the second preset condition, and that is determined by the second terminal.

S703. The first terminal receives the second indication information.

S704. The first terminal determines, based on the second indication information, a second LCID meeting the second preset condition.

It may be understood that, for a specific implementation of step S704, refer to the fourth implementation in step S402. Details are not described herein again.

S705. The second terminal uses the first LCID as an input parameter of a security algorithm of a second PDCP entity to perform security protection on a first data packet.

S706. The second terminal sends the first data packet on which security protection is performed to the first terminal.

S707. The first terminal receives the first data packet on which security protection is performed.

S708. The first PDCP entity of the first terminal parses, based on the second LCID, the first data packet on which security protection is performed.

It may be understood that, for specific implementations of steps S705 to S708, refer to steps S403 to S406. Details are not described herein again.

It should be noted that an execution sequence of steps S702 to S704 and steps S705 to S707 is not limited in this embodiment. For example, steps S702 to S704 may be performed before or after steps S705 to S707, or may be performed at any time when steps S705 to S707 are performed. In FIG. 7, only an example in which steps S702 to S704 are performed before steps S705 to S707 is used for description.

It may be understood that, in this embodiment, the second terminal independently determines the first LCID based on LCH configuration parameters of two or more LCHs associated with the second PDCP entity, and sends the second indication information to the first terminal, to indicate the first terminal to use the first LCID as the input parameter of the security algorithm of the first PDCP entity. In this way, consistency in input parameters can be ensured when the corresponding PDCP entities of the second terminal and the first terminal execute the security algorithm. Therefore, the first terminal can normally parse the data packet on which security protection is performed and that is sent by the second terminal, so that normal communication can be performed on an SL between the first terminal and the second terminal.

Figure 8:
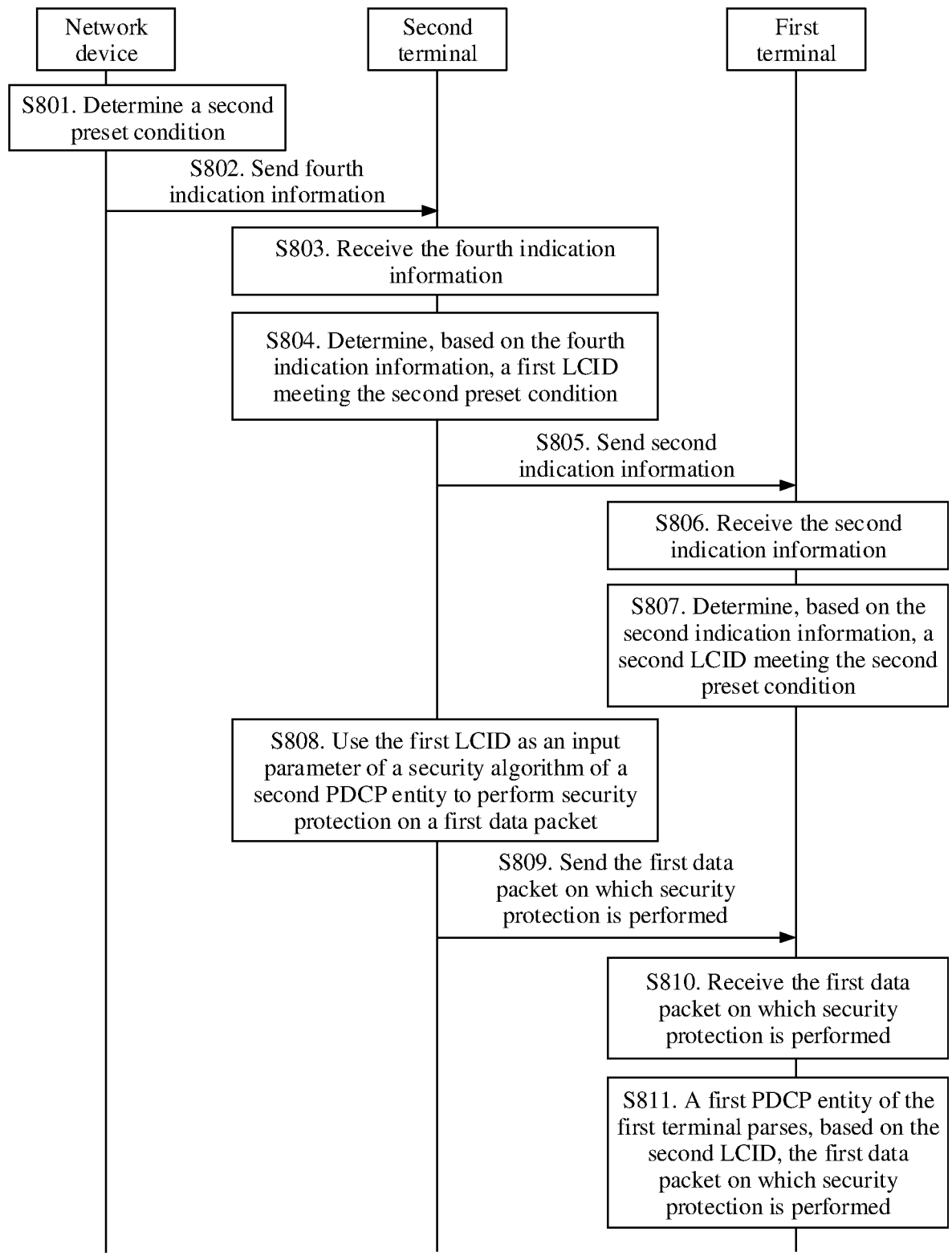
FIG. 8 is a schematic flowchart of another communication method according to an embodiment of this application.

For example, an embodiment of this application further provides a communication method. The communication method corresponds to the sixth implementation in step S401 and the fourth implementation in step S402. As shown in FIG. 8, the method includes steps S801 to S811.

S801. A network device determines a second preset condition.

For example, the network device may be an access network device or a core network device. This is not limited in this embodiment of this application.

S802. The network device sends fourth indication information to a second terminal.

The fourth indication information includes a target LCH configuration parameter, and the fourth indication information is used to indicate the second terminal to use an LCID meeting the second preset condition as an input parameter of a security algorithm of a second PDCP entity of the second terminal, where the LCID meeting the second preset condition is an LCID corresponding to the target LCH configuration parameter.

The second PDCP entity of the second terminal is associated with two or more logical channels (LCHs).

S803. The second terminal receives the fourth indication information.

S804. The second terminal determines, based on the fourth indication information, a first LCID meeting the second preset condition.

It may be understood that, for a specific implementation of step S804, refer to the sixth implementation in step S401. Details are not described herein again.

S805. The second terminal sends second indication information to a first terminal.

The second indication information includes the first LCID, and the second indication information is used to indicate the first terminal to use the first LCID as an input parameter of a security algorithm of a first PDCP entity. The first LCID is an LCID that corresponds to an LCH, that meets the second preset condition, and that is determined by the second terminal.

S806. The first terminal receives the second indication information.

S807. The first terminal determines, based on the second indication information, a second LCID meeting the second preset condition.

It may be understood that, for a specific implementation of step S807, refer to the fourth implementation in step S402. Details are not described herein again.

S808. The second terminal uses the first LCID as an input parameter of a security algorithm of a second PDCP entity to perform security protection on a first data packet.

S809. The second terminal sends the first data packet on which security protection is performed to the first terminal.

S810. The first terminal receives the first data packet on which security protection is performed.

S811. The first PDCP entity of the first terminal parses, based on the second LCID, the first data packet on which security protection is performed.

It may be understood that, for specific implementations of steps S808 to S811, refer to steps S403 to S406. Details are not described herein again.

It should be noted that an execution sequence of steps S805 to S807 and steps S808 to S810 is not limited in this embodiment. For example, steps S805 to S807 may be performed before or after steps S808 to S810, or may be performed at any time when steps S808 to S810 are performed. In FIG. 8, only an example in which steps S805 to S807 are performed before steps S808 to S810 is used for description.

It may be understood that, in this embodiment, the second terminal receives the fourth indication information sent by the network device, determines, based on the fourth indication information, the first LCID meeting the second preset condition, and sends the second indication information to the first terminal, to indicate the first terminal to use the first LCID as the input parameter of the security algorithm of the first PDCP entity. In this way, consistency in input parameters can be ensured when the corresponding PDCP entities of the second terminal and the first terminal execute the security algorithm. Therefore, the first terminal can normally parse the data packet on which security protection is performed and that is sent by the second terminal, so that normal communication can be performed on an SL between the first terminal and the second terminal.

For example, when the input parameter of the security algorithm is an SLRB ID, an SL-data radio bearer (DRB) may be exchanged by using a PC5-RRC message, so that sender UE and receiver UE match SLRB IDs corresponding to the SL-DRB. For SL-signaling radio bearers (SRBs), most SL-SRBs that carry a PC5-S message are sent before a PC5-RRC message is sent. Therefore, the PDCP entities of the second terminal and the first terminal may not correctly execute security algorithms by learning of an SLRB ID of an SL-SRB based on the PC5-RRC message.

Figure 9:
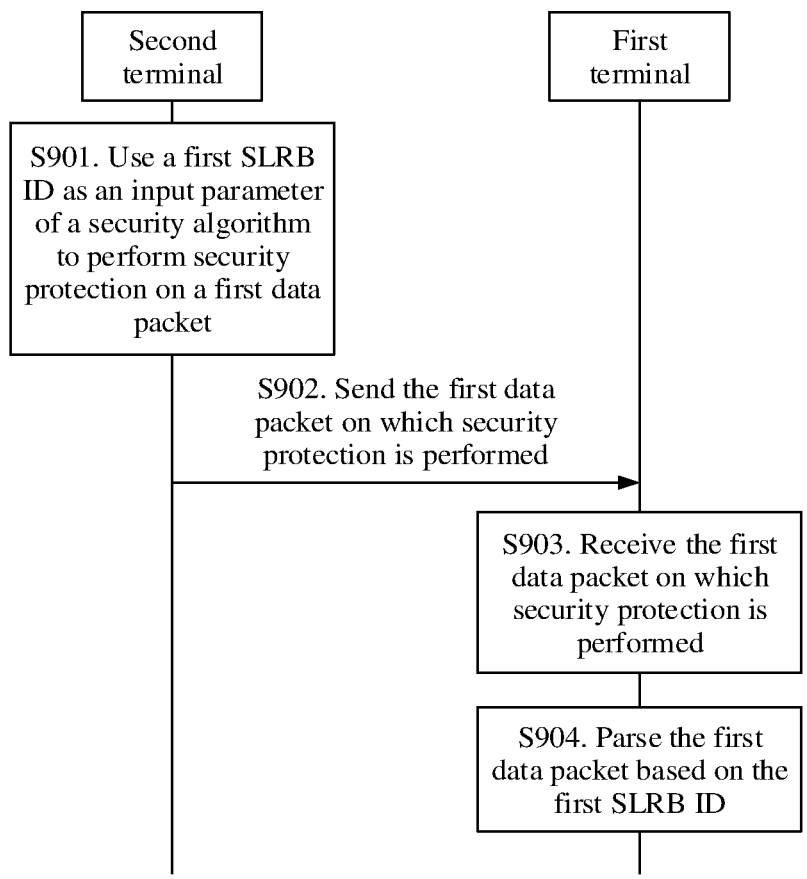
FIG. 9 is a schematic flowchart of another communication method according to an embodiment of this application.

To resolve a problem that an SL-SRB cannot support security protection because when an input parameter of a security algorithm is an SLRB ID, a PDCP entity corresponding to the SL-SRB performs a security protection algorithm, and sender UE and receiver UE may not learn of, by using a PC5-RRC message, the SLRB ID corresponding to the SL-SRB, an embodiment of this application provides a communication method. As shown in FIG. 9, the method includes steps S901 to S904.

S901. A second terminal uses a first SLRB ID as an input parameter of a security algorithm to perform security protection on a first data packet.

For example, that a second terminal uses a first SLRB ID as an input parameter of a security algorithm to perform security protection on a first data packet includes: The second terminal uses the first SLRB ID as the input parameter of the security algorithm to perform encryption and/or integrity protection on the first data packet.

S902. The second terminal sends the first data packet on which security protection is performed to a first terminal.

The first data packet carries the first SLRB ID.

For example, a header of the first data packet carries the first SLRB ID. For example, a PDCP header of the first data packet carries the first SLRB ID.

S903. The first terminal receives the first data packet on which security protection is performed.

S904. The first terminal parses the first data packet based on the first SLRB ID.

For example, because the header of the first data packet carries the first SLRB ID, when receiving the first data packet and processing the first data packet at a PDCP layer, the first terminal may determine, based on the first SLRB ID carried in the header of the data packet, that an input parameter of a security algorithm corresponding to a PDCP entity is the first SLRB ID. Therefore, corresponding PDCP entities of the second terminal and the first terminal may use a same SLRB ID as an input parameter, to ensure that data transmission on an SL between the second terminal and the first terminal can be protected by using a security algorithm.

It may be understood that the method in S901 to S904 is not only applicable to security protection on a data packet corresponding to an SL-SRB, but also applicable to security protection on a data packet corresponding to an SL-DRB.

It may be understood that, in this embodiment, the second terminal uses the first SLRB ID as the input parameter of the security algorithm to perform security protection on the first data packet, and sends, to the first terminal, the first data packet carrying the first SLRB ID, so that after receiving the first data packet, the first terminal can parse the first data packet based on the first SLRB ID carried in the header of the first data packet. Therefore, the second terminal and the first terminal may use a same SLRB ID as an input parameter, to ensure that data transmission on an SL between the second terminal and the first terminal can be protected by using a security algorithm.

Figure 10:
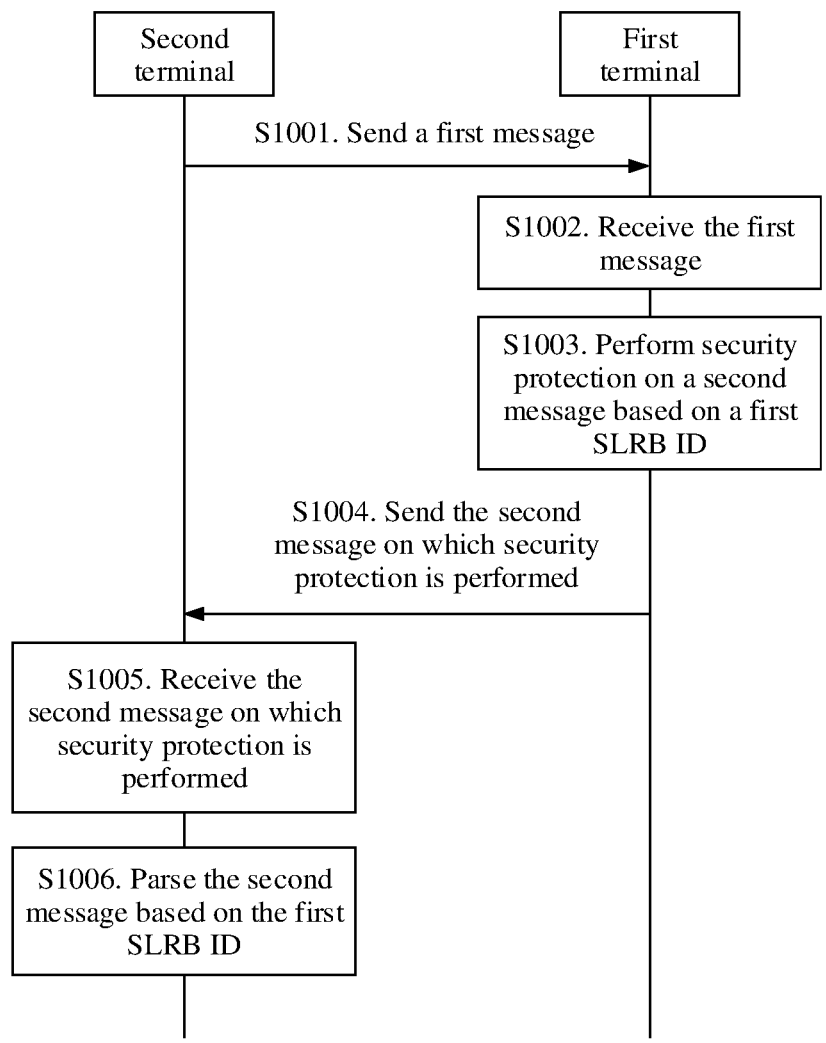
FIG. 10 is a schematic flowchart of another communication method according to an embodiment of this application.

To resolve a problem that an SL-SRB cannot support security protection because when an input parameter of a security algorithm is an SLRB ID, a PDCP entity corresponding to the SL-SRB performs a security protection algorithm, and sender UE and receiver UE may not learn of, by using a PC5-RRC message, the SLRB ID corresponding to the SL-SRB, An embodiment of this application further provides a communication method. As shown in FIG. 10, the method includes S1001 to S1006.

S1001. A second terminal sends a first message to a first terminal.

The first message carries a first SLRB ID.

For example, the first message is a PC5-S message. The first SLRB ID is carried in the PC5-S message. The PC5-S message may be a message used in a process of establishing a PC5-S connection between the second terminal and the first terminal. The first SLRB ID is an SRB ID corresponding to an SRB that carries the second message following the first message.

For example, in this embodiment, information indicating an SLRB ID of an SRB may directly indicate an SLRB ID corresponding to an SRBX, or may indicate an SLRB ID corresponding to an LCID. This is not limited in this embodiment of this application. The following embodiment is described only by using an example in which an indicated SLRB ID of an SRB is an SLRB ID corresponding to an SRBX.

For example, the message used in the process of establishing the PC5-S connection may include a message 1 to a message 4. The message 1 is a connection establishment request message sent by the second terminal to the first terminal, the message 2 is a security activation command message sent by the first terminal to the second terminal, the message 3 is a security activation complete message fed back by the second terminal to the first terminal, and the message 4 is a PC5-S connection establishment accept message fed back by the first terminal to the second terminal.

For example, an SRB 0 is used to carry a PC5-S message (for example, the message 1 in establishment of the PC5-S connection) without security protection, an SRB 1 is used to carry PC5-S messages (for example, the message 2 and the message 3 in establishment of the PC5-S connection) related to security activation, an SRB 2 is used to carry a PC5-S message (for example, the message 4 in establishment of the PC5-S connection) for security protection, and an SRB 3 is used to carry a PC5-RRC message. A specific quantity of SL-SRBs carrying the PC5-S message and the PC5-RRC message and a specific SRBX carried in each message are not limited in this embodiment of this application. This is merely an example for description herein.

It may be understood that the first message may be any one of the message 1 to the message 4 in the process of establishing the PC5-S connection. For example, the first message is the message 1. The second message may be a PC5-S message or a PC5-RRC message following the message 1.

Figure 11:
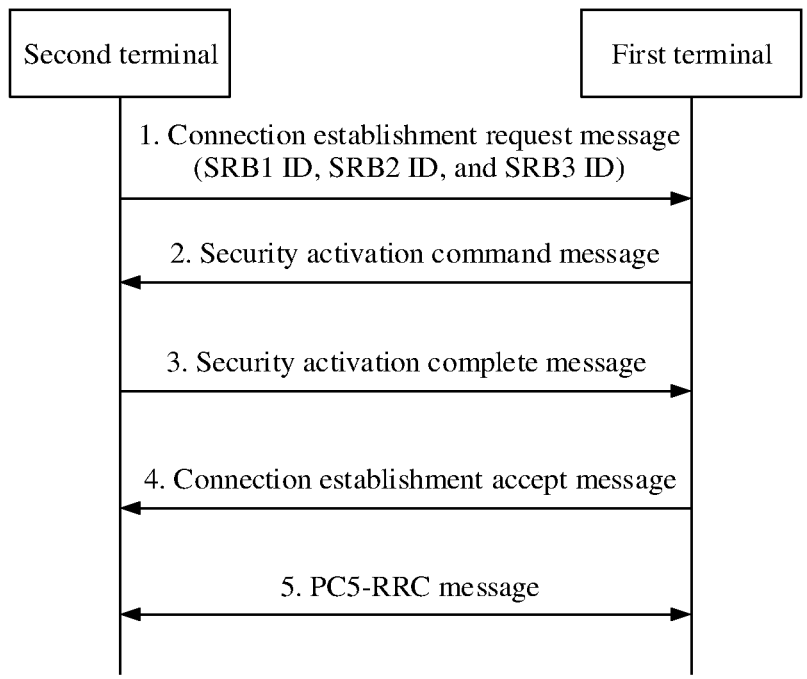
FIG. 11 is a schematic application diagram showing that an SLRB ID is an input parameter of a security algorithm according to an embodiment of this application.

For example, as shown in FIG. 11, the second terminal may include, in the message 1, an SRB ID corresponding to an SRB carrying a PC5-S message and a PC5-RRC message that are following the message 1, and send the first message to the first terminal. In other words, the second terminal may send, in the message 1 to the first terminal at a time, the SRB ID corresponding to the SRB carrying the PC5-S message and the PC5-RRC message that are following the message 1.

Figure 12:
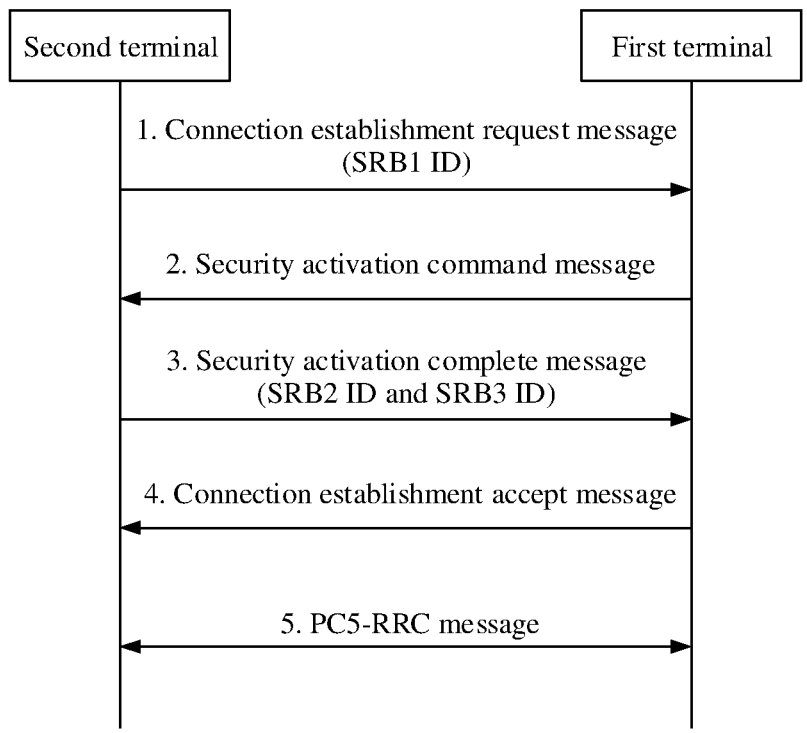
FIG. 12 is another schematic application diagram showing that an SLRB ID is an input parameter of a security algorithm according to an embodiment of this application.

For example, as shown in FIG. 12, the second terminal may include, in the message 1, an SRB ID corresponding to an SRB carrying the message 2, and send the first message to the first terminal. In other words, the second terminal may send, to the first terminal, only an SRB ID corresponding to an SRB carrying one or more messages following the message 1.

An SRB ID that is carried in the first message and that is of an SRB carrying a specific message following the first message is not limited in this embodiment of this application. FIG. 11 and FIG. 12 are merely examples for description.

S1002. The first terminal receives the first message.

For example, after receiving the first message, the first terminal may learn of the SRB ID corresponding to the SRB carrying the second message.

S1003. The first terminal performs security protection on the second message based on the first SLRB ID.

For example, that the first terminal performs security protection on the second message based on the first SLRB ID includes: The first terminal uses the first SLRB ID as an input parameter of a security algorithm to perform encryption and/or integrity protection on the second message.

For example, the second message may be a PC5-S message, or may be a PC5-RRC message. It should be noted that the second message is a message following the first message. In other words, the second terminal may send, to the first terminal in advance, the SRB ID of the SRB carrying the second message, so that the first terminal can perform security protection on the second message based on the SRB ID of the SRB carrying the second message.

For example, when the first message is the message 1, the second message may be the message 2, the message 4, or the PC5-RRC message. When the second message is the message 2, the first SLRB ID carried in the first message includes the SRB ID corresponding to the SRB that carries the message 2. That is, the first SLRB ID carried in the message 1 includes an SRB1 ID.

It should be noted that all SRB IDs corresponding to SRBs carrying the PC5-S message and the PC5-RRC message may be determined by the second terminal, or may be jointly determined by the second terminal and the first terminal (for example, the SRB1 ID is determined by the second terminal, and an SRB2 ID and an SRB3 ID are determined by the first terminal). This is not limited in this application. In this embodiment, only an example in which the SRB ID corresponding to the SRB carrying the second message is determined by the second terminal is used for description.

S1004. The first terminal sends the second message on which security protection is performed to the second terminal.

S1005. The second terminal receives the second message on which security protection is performed.

S1006. The second terminal parses the second message based on the first SLRB ID.

For example, in this embodiment, the first SLRB ID is determined by the second terminal, and the second terminal may parse, based on the first SLRB ID, the second message on which security protection is performed and that is sent by the first terminal.

In this embodiment, the second terminal sends, to the first terminal, the first message carrying the first SLRB ID, where the first SLRB ID is the SRB ID corresponding to the SRB carrying the second message, so that the first terminal can perform security protection on the second message based on the first SLRB ID. The second terminal receives the second message on which security protection is performed from the first terminal, and parses the second message based on the first SLRB ID. That is, in this embodiment, the second terminal sends, to the first terminal in advance, the first SLRB ID corresponding to the SRB carrying the second message, so that the first terminal learns of the input parameter used when security protection is performed on the second message, thereby ensuring the input parameter used when the first terminal performs security protection on the second message is consistent with an input parameter used when the second terminal parses the second message. Therefore, transmission on an SL between the second terminal and the first terminal can be protected by using a security algorithm.

For example, when the second message is the message 3 or the PC5-RRC message, in step S1003, the first terminal may perform security parsing on the second message based on the first SLRB ID. In this implementation, after steps S1001 and S1002, the second terminal may further perform security protection on the second message based on the first SLRB ID, and send the second message on which security protection is performed to the first terminal. After receiving the second message, the first terminal may perform security parsing on the second message based on the first SLRB ID. In other words, the second terminal sends the first SLRB ID to the first terminal in advance, so that after receiving the second message on which security protection is performed, the first terminal may parse the second message based on the first SLRB ID. For example, as shown in FIG. 11, the second terminal includes the SRB1 ID, the SRB2 ID, and the SRB3 ID in the message 1. The second terminal may perform security protection on the message 3 based on the SRB1 ID, and send the message 3 on which security protection is performed to the first terminal. The first terminal receives the message 3, and parses the message 3 based on the SRB1 ID carried in the message 1.

It should be noted that when the SRB ID corresponding to the SRB carrying the second message is determined by the first terminal, the first terminal may send, to the second terminal in advance, the SRB ID corresponding to the SRB carrying the second message, so that the second terminal performs security protection on the second message based on the SRB ID, ensuring that an input parameter used by the second terminal to perform security protection on the second message is consistent with an input parameter used by the first terminal to parse the second message. Therefore, data transmission on the SL between the second terminal and the first terminal can be protected by using a security algorithm.

The foregoing mainly describes the solutions provided in embodiments of this application from a perspective of method steps. It may be understood that, to implement the foregoing functions, a computer includes corresponding hardware structures and/or software modules for performing the functions. A person skilled in the art should be easily aware that, in combination with modules and algorithm steps of the examples described in embodiments disclosed in this specification, this application can be implemented by a combination of hardware and computer software. A person skilled in the art may use different methods to implement the described functions for each particular application, but it should not be considered that the implementation goes beyond the scope of this application.

In embodiments of this application, the computer may be divided into function modules based on the foregoing method examples. For example, function modules may be obtained through division based on corresponding functions, or two or more functions may be integrated into one processing module. The integrated module may be implemented in a form of hardware, or may be implemented in a form of a software function module. It should be noted that, in this embodiment of this application, division into the modules is an example, and is merely a logical function division. In actual implementation, another division manner may be used.

Figure 13:
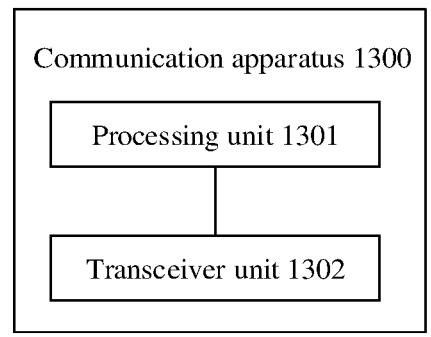
FIG. 13 is a schematic diagram of composition of a communication apparatus according to an embodiment of this application.

FIG. 13 is a schematic diagram of a structure of a communication apparatus 1300 when various function modules are obtained through division based on various functions. The communication apparatus 1300 may be the second terminal in the foregoing embodiments, or may be a chip in the second terminal. The communication apparatus 1300 includes a processing unit 1301 and a transceiver unit 1302.

The processing unit 1301 may perform, for example, S401 and S403 in FIG. 4, S501 and S505 in FIG. 5, S604 and S608 in FIG. 6, S701 and S705 in FIG. 7, S804 and S808 in FIG. 8, S901 in FIG. 9, or S1006 in FIG. 10. The transceiver unit 1302 may perform, for example, S404 in FIG. 4, S502 and S506 in FIG. 5, S603, S605, and S609 in FIG. 6, S702 and S706 in FIG. 7, S803, S805, and S809 in FIG. 8, S902 in FIG. 9, or S1001 and S1005 in FIG. 10. It may be understood that the processing unit 1301 may further send and receive information through the transceiver unit 1302, or may be configured to communicate with another network element, and/or may be configured to perform another process of the technology described in this specification. All related content of the steps in the method embodiments may be cited in function descriptions of corresponding function modules. Details are not described herein again.

Figure 14:
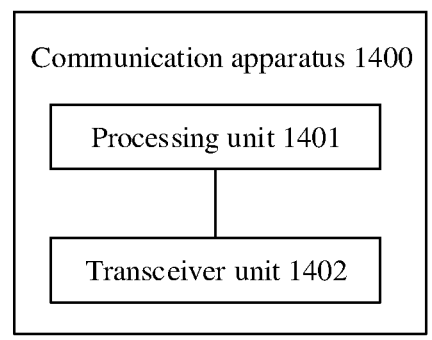
FIG. 14 is a schematic diagram of composition of another communication apparatus according to an embodiment of this application.

FIG. 14 is a schematic diagram of a structure of a communication apparatus 1400 when various function modules are obtained through division based on various functions. The communication apparatus 1400 may be the first terminal in the foregoing embodiments, or may be a chip in the first terminal. The communication apparatus 1400 includes a processing unit 1401 and a transceiver unit 1402.

The processing unit 1401 may perform, for example, S402 and S406 in FIG. 4, S504 and S508 in FIG. 5, S607 and S611 in FIG. 6, S704 and S708 in FIG. 7, S807 and S811 in FIG. 8, S904 in FIG. 9, or S1003 in FIG. 10. The transceiver unit 1402 may perform, for example, S405 in FIG. 4, S503 and S507 in FIG. 5, S606 and S610 in FIG. 6, S703 and S707 in FIG. 7, S806 and S810 in FIG. 8, S903 in FIG. 9, or S1002 and S1004 in FIG. 10. It may be understood that the processing unit 1401 may further send and receive information through the transceiver unit 1402, or may be configured to communicate with another network element, and/or may be configured to perform another process of the technology described in this specification. All related content of the steps in the method embodiments may be cited in function descriptions of corresponding function modules. Details are not described herein again.

Figure 15:
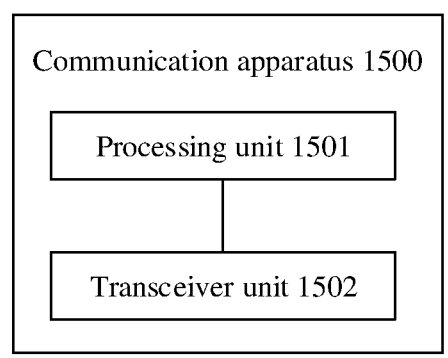
FIG. 15 is a schematic diagram of composition of another communication apparatus according to an embodiment of this application.

FIG. 15 is a schematic diagram of a structure of a communication apparatus 1500 when various function modules are obtained through division based on various functions. The communication apparatus 1500 may be the network device in the foregoing embodiments, or may be a chip in the network device. The communication apparatus 1500 includes a processing unit 1501 and a transceiver unit 1502.

The processing unit 1501 may perform S601 in FIG. 6 or S801 in FIG. 8. The transceiver unit 1502 may perform S602 in FIG. 6 or S802 in FIG. 8. It may be understood that the processing unit 1501 may further send and receive information through the transceiver unit 1502, or may be configured to communicate with another network element, and/or may be configured to perform another process of the technology described in this specification. All related content of the steps in the method embodiments may be cited in function descriptions of corresponding function modules. Details are not described herein again.

Figure 16:
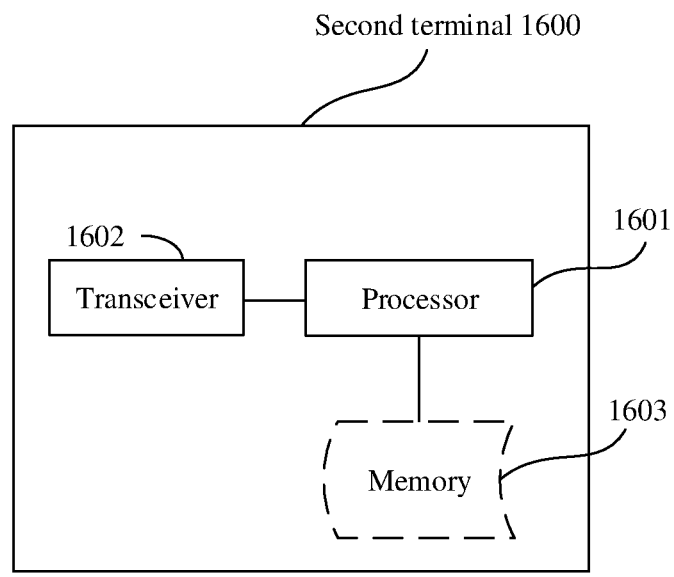
FIG. 16 is a schematic diagram of composition of a first terminal according to an embodiment of this application.

When an integrated unit is used, FIG. 16 is a possible schematic diagram of a structure of the second terminal in the foregoing embodiments. The second terminal 1600 includes a processor 1601 and a transceiver 1602.

The processor 1601 is configured to control and manage an action of the second terminal 1600. For example, the processor 1601 may perform S401 and S403 in FIG. 4, S501 and S505 in FIG. 5, S604 and S608 in FIG. 6, S701 and S705 in FIG. 7, S804 and S808 in FIG. 8, S901 in FIG. 9, or S1006 in FIG. 10, and/or another process used for the technology described in this specification.

The transceiver 1602 is configured to send and receive information, or configured to communicate with another network element. For example, the transceiver 1602 may perform S404 in FIG. 4, S502 and S506 in FIG. 5, S603, S605, and S609 in FIG. 6, S702 and S706 in FIG. 7, S803, S805, and S809 in FIG. 8, S902 in FIG. 9, or S1001 and S1005 in FIG. 10, and/or another process used for the technology described in this specification.

Optionally, the second terminal 1600 may further include a memory 1603, and the memory 1603 is configured to store program code and data corresponding to any one of the foregoing communication methods performed by the second terminal 1600. The memory 1603 may be a read-only memory (ROM), another type of static storage device that can store static information and instructions, a random access memory (RAM), or the like. The second terminal 1600 may be the communication device shown in FIG. 2.

Descriptions of all related content of the components in FIG. 2 may be cited in function descriptions of the corresponding components in FIG. 16. Details are not described herein again.

Figure 17:
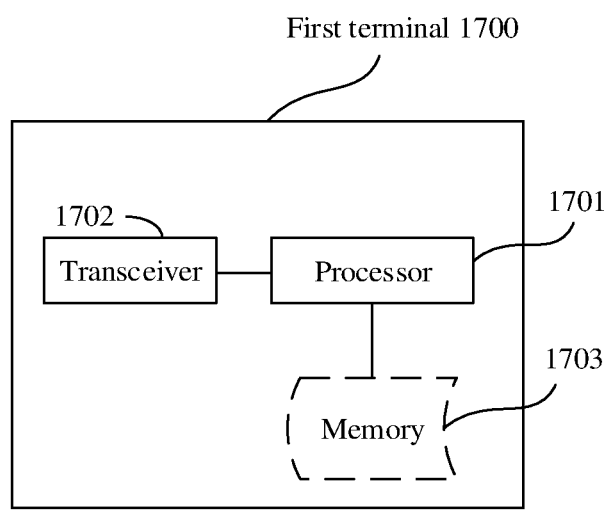
FIG. 17 is a schematic diagram of composition of a second terminal according to an embodiment of this application.

When an integrated unit is used, FIG. 17 is a possible schematic diagram of a structure of the first terminal 1700 in the foregoing embodiments. The first terminal 1700 includes a processor 1701 and a transceiver 1702.

The processor 1701 is configured to control and manage an action of the first terminal 1700. For example, the processor 1701 may perform S402 and S406 in FIGS. 4, S504 and S508 in FIGS. 5, S607 and S611 in FIGS. 6, S704 and S708 in FIGS. 7, S807 and S811 in FIG. 8, S904 in FIG. 9, or S1003 in FIG. 10, and/or another process used for the technology described in this specification.

The transceiver 1702 is configured to send and receive information, or configured to communicate with another network element. For example, the transceiver 1702 may perform S405 in FIG. 4, S503 and S507 in FIG. 5, S606 and S610 in FIG. 6, S703 and S707 in FIG. 7, S806 and S810 in FIG. 8, S903 in FIG. 9, or S1002 and S1004 in FIG. 10, and/or another process used for the technology described in this specification.

Optionally, the first terminal 1700 may further include a memory 1703, and the memory 1703 is configured to store program code and data corresponding to any one of the foregoing communication methods performed by the first terminal 1700. The memory 1703 may be a read-only memory (ROM), another type of static storage device that can store static information and instructions, a random access memory (RAM), or the like. The first terminal 1700 may be the communication device shown in FIG. 2. Descriptions of all related content of the components in FIG. 2 may be cited in function descriptions of the corresponding components in FIG. 17. Details are not described herein again.

Figure 18:
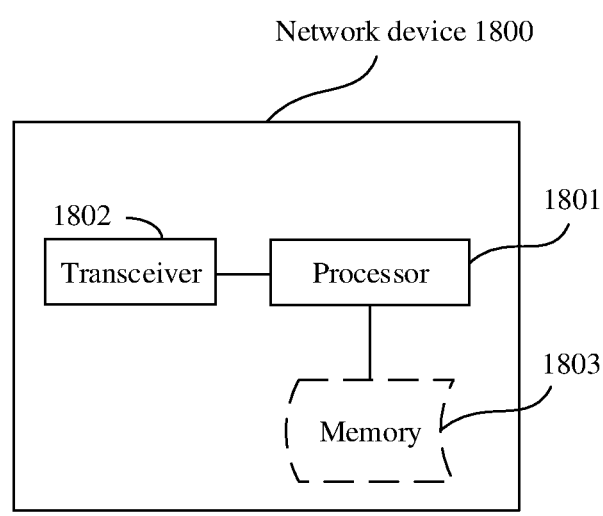
FIG. 18 is a schematic diagram of composition of a network device according to an embodiment of this application.

When an integrated unit is used, FIG. 18 is a possible schematic diagram of a structure of the network device 1800 in the foregoing embodiments. The network device 1800 includes a processor 1801 and a transceiver 1802.

The processor 1801 is configured to control and manage an action of the network device 1800. For example, the processor 1801 may perform S601 in FIG. 6 or S801 in FIG. 8, and/or another process used for the technology described in this specification.

The transceiver 1802 is configured to send and receive information, or configured to communicate with another network element. For example, the transceiver 1802 may perform S602 in FIG. 6 or S802 in FIG. 8, and/or another process used for the technology described in this specification.

Optionally, the network device 1800 may further include a memory 1803, and the memory 1803 is configured to store program code and data corresponding to any one of the foregoing communication methods performed by the network device 1800. The memory 1803 may be a read-only memory (ROM), another type of static storage device that can store static information and instructions, a random access memory (RAM), or the like. The network device 1800 may be the communication device shown in FIG. 2. Descriptions of all related content of the components in FIG. 2 may be cited in function descriptions of the corresponding components in FIG. 18. Details are not described herein again.

An embodiment of this application further provides a communication apparatus. The communication apparatus includes a processor, and may further include a transceiver and a memory. The transceiver is configured to send and receive information, or is configured to communicate with another network element. The memory is configured to store computer-executable instructions. The processor is configured to execute the computer-executable instructions, to support a terminal device in implementing the communication method in any embodiment in FIG. 4 to FIG. 10.

An embodiment of this application further provides a communication apparatus. The communication apparatus includes a processor, and may further include a transceiver and a memory. The transceiver is configured to send and receive information, or is configured to communicate with another network element. The memory is configured to store computer-executable instructions. The processor is configured to execute the computer-executable instructions, to support a network device in implementing the communication method in either embodiment in FIG. 6 or FIG. 8.

An embodiment of this application further provides a computer-readable storage medium. The computer-readable storage medium stores computer program code. When the foregoing processor executes the computer program code, an electronic device performs the communication method in any embodiment in FIG. 4 to FIG. 10.

An embodiment of this application further provides a computer program product. When the computer program product runs on a computer, the computer is enabled to perform the communication method in any embodiment in FIG. 4 to FIG. 10.

An embodiment of this application further provides a communication apparatus. The apparatus may exist in a product form of a chip. A structure of the apparatus includes a processor and an interface circuit. The processor is configured to communicate with another apparatus through a receiving circuit, to enable the apparatus to perform the communication method in any embodiment in FIG. 4 to FIG. 10.

An embodiment of this application further provides a communication system, including a second terminal and a first terminal. The second terminal and the first terminal may perform the communication method in any embodiment in FIG. 4 to FIG. 10.

Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be further a component of the processor. The processor and the storage medium may be located in an ASIC. In addition, the ASIC may be located in a core network interface device. Certainly, the processor and the storage medium may exist in the core network interface device as discrete components.

A person of ordinary skill in the art should be aware that in one or more of the foregoing examples, the functions described in this application may be implemented by using hardware, software, firmware, or any combination thereof. When the functions are implemented by software, the foregoing functions may be stored in a computer-readable medium or transmitted as one or more instructions or code in the computer-readable medium. The computer-readable medium includes a computer-readable storage medium and a communication medium. The communication medium includes any medium that facilitates transmission of a computer program from one place to another. The storage medium may be any available medium accessible to a general-purpose or special-purpose computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A communication method, comprising:
   determining, by a first terminal, a first logical channel identifier (LCID) meeting a preset condition, wherein a first packet data convergence protocol (PDCP) entity of the first terminal is associated with two or more logical channels (LCHs);
   receiving, by the first terminal, a first data packet from a second terminal, wherein security protection is performed on the first packet using a second LCID as an input parameter of a security algorithm of a second PDCP entity of the second terminal; and
   parsing, by the first PDCP entity of the first terminal, the first data packet using the first LCID, wherein the preset condition met by the first LCID used by the first PDCP entity of the first terminal to parse the first data packet is the same as a preset condition met by the second LCID used by the second terminal to perform the security protection on the first data packet.

2. The method according to claim 1, wherein the preset condition comprises a first preset condition, and a size of the first LCID meets the first preset condition.

3. The method according to claim 2, wherein the determining, by a first terminal, a first logical channel identifier (LCID) meeting a preset condition comprises:
   determining, by the first terminal according to a preset rule, the first LCID meeting the first preset condition.

4. The method according to claim 2, further comprising:
   receiving, by the first terminal, first indication information from the second terminal, wherein the first indication information indicates the first terminal to use an LCID meeting the first preset condition as an input parameter of a security algorithm of the first PDCP entity.

5. The method according to claim 4, wherein the determining, by a first terminal, a first logical channel identifier (LCID) meeting a preset condition comprises:
   determining, by the first terminal based on the first indication information, the first LCID meeting the first preset condition.

6. The method according to claim 5, wherein the first indication information is carried in first sidelink radio bearer (SLRB) configuration information, and the first SLRB configuration information is carried in a PC5-radio resource control (RRC) message.

7. The method according to claim 2, wherein the first LCID meeting the first preset condition is a smallest LCID or a largest LCID in LCIDs corresponding to the two or more LCHs.

8. A communication method, comprising:
   determining, by a second terminal, a second logical channel identifier (LCID) meeting a preset condition, wherein a second packet data convergence protocol (PDCP) entity of the second terminal is associated with two or more logical channels (LCHs);
   using, by the second terminal, the second LCID as an input parameter of a security algorithm of the second PDCP entity to perform security protection on a first data packet; and
   sending, by the second terminal, the first data packet on which security protection is performed to a first terminal, wherein the second LCID used by the second terminal to perform security protection on the first data packet is the same as a first LCID used as an input parameter by a first PDCP entity of the first terminal to parse the first data packet, and the first PDCP entity of the first terminal corresponds to the second PDCP entity of the second terminal.

9. The method according to claim 8, wherein the preset condition comprises a first preset condition, and a size of the second LCID meets the first preset condition.

10. The method according to claim 9, wherein the determining, by a second terminal, a second logical channel identifier (LCID) meeting a preset condition comprises:
    determining, by the second terminal according to a predefined rule, the second LCID meeting the first preset condition.

11. The method according to claim 9, wherein the determining, by a second terminal, a second logical channel identifier (LCID) meeting a preset condition comprises:
    determining, by the second terminal based on sizes of LCIDs corresponding to the two or more LCHs, an LCID meeting the first preset condition.

12. The method according to claim 9, wherein the second LCID meeting the first preset condition is a smallest LCID or a largest LCID in the LCIDs corresponding to the two or more LCHs.

13. A communication apparatus, comprising:
    at least one processor, and a memory configured to store instructions that, when executed by the at least one processor, cause the apparatus to:
    determine a first logical channel identifier (LCID) meeting a preset condition, wherein a first packet data convergence protocol (PDCP) entity of a first terminal is associated with two or more logical channels (LCHs);
    receive a first data packet from a second terminal, wherein security protection is performed on the first data packet using a second LCID as an input parameter of a security algorithm of a second PDCP entity of the second terminal; and
    parse the first data packet using the first LCID, wherein the preset condition met by the first LCID used by the first terminal to parse the first data packet is the same as a preset condition met by the second LCID used by the second terminal to perform the security protection on the first data packet.

14. The apparatus according to claim 13, wherein the preset condition comprises a first preset condition, and a size of the first LCID meets the first preset condition.

15. The apparatus according to claim 14, wherein the instructions, when executed by the at least one processor, further cause the apparatus to:
    determine, according to a predefined rule, tbe first LCID meeting the first preset condition.

16. The apparatus according to claim 14, wherein the instructions, when executed by the at least one processor, further cause the apparatus to:
receive first indication information from the second terminal, wherein the first indication information indicates the first terminal to use an LCID meeting the first preset condition as an input parameter of a security algorithm of the first PDCP entity.

17. The apparatus according to claim 16, wherein the first LCID meeting the first preset condition is determined based on the first indication information.

18. The apparatus according to claim 17, wherein the first indication information is carried in first sidelink radio bearer (SLRB) configuration information, and the first SLRB configuration information is carried in a PC5-radio resource control (RRC) message.

19. The apparatus according to claim 14, wherein the first LCID meeting the first preset condition is a smallest LCID or a largest LCID in LCIDs corresponding to the two or more LCHs.

20. The communication method according to claim 1, wherein the first LCID used by the first PDCP entity of the first terminal to parse the first data packet is the same as the second LCID used by the second PDCP entity of the second terminal to perform security protection on the first data packet.

21. The communication method according to claim 4, wherein the first indication information includes the second LCID used by the second PDCP entity of the second terminal to perform the security protection on the first data packet.

* * * * *